(12) United States Patent　(10) Patent No.: US 10,127,203 B2
Mizumoto　(45) Date of Patent: Nov. 13, 2018

(54) INFORMATION PROCESSING APPARATUS AND MAIL CREATING METHOD

(71) Applicant: KYOCERA Corporation, Kyoto-shi, Kyoto (JP)

(72) Inventor: Akira Mizumoto, Nishinomiya (JP)

(73) Assignee: KYOCERA Corporation, Kyoto (JP)

( * ) Notice: Subject to any disclaimer, the term of this patent is extended or adjusted under 35 U.S.C. 154(b) by 176 days.

(21) Appl. No.: 15/055,458

(22) Filed: Feb. 26, 2016

(65) Prior Publication Data

US 2016/0179771 A1　Jun. 23, 2016

Related U.S. Application Data

(63) Continuation of application No. PCT/JP2014/072401, filed on Aug. 27, 2014.

(30) Foreign Application Priority Data

Aug. 28, 2013　(JP) ................. 2013-176558

(51) Int. Cl.
*G06F 17/00* (2006.01)
*G06F 17/22* (2006.01)
*G06F 3/0488* (2013.01)

(52) U.S. Cl.
CPC ........ *G06F 17/2247* (2013.01); *G06F 3/0488* (2013.01)

(58) Field of Classification Search
None
See application file for complete search history.

(56) References Cited

U.S. PATENT DOCUMENTS

2007/0244976 A1* 10/2007 Carroll ................. G06Q 10/107
　　　　　　　　　　　　　　　　　　　709/206
2008/0306963 A1* 12/2008 Adler ................... G06Q 10/109
(Continued)

FOREIGN PATENT DOCUMENTS

JP　　2005-352655 A　　12/2005
JP　　2006-48438 A　　2/2006
(Continued)

OTHER PUBLICATIONS

International Search Report and Written Opinion of the International Searching Authority issued by the Japanese Patent Office for International Application No. PCT/JP2014/072401.

*Primary Examiner* — Howard Cortes
(74) *Attorney, Agent, or Firm* — Procopio Cory Hargreaves and Savitch LLP

(57) ABSTRACT

An information processing apparatus has an operation unit capable of inputting at least any character and a computer. The computer registers calendar event information at least including any date and time and a word indicating an event held on that date and time to an electronic calendar. When a character string inputted by the operation unit matches with a date and time or a word included in calendar event information registered to the electronic calendar, the computer can display calendar event information including the matched date and time or the matched word as an input candidate. When any calendar event information displayed as an input candidate display is selected by the operation unit, the computer can describe the selected calendar event information in an electronic mail.

6 Claims, 17 Drawing Sheets

(56) References Cited

U.S. PATENT DOCUMENTS

| | | | |
|---|---|---|---|
| 2011/0202864 A1* | 8/2011 | Hirsch | G06F 3/0482 715/773 |
| 2011/0302249 A1* | 12/2011 | Orr | G06Q 10/107 709/206 |
| 2013/0091426 A1 | 4/2013 | Hashida et al. | |
| 2013/0093793 A1* | 4/2013 | Edwards | G06T 13/00 345/660 |
| 2014/0040741 A1* | 2/2014 | van Os | G06F 3/0481 715/719 |
| 2014/0337751 A1* | 11/2014 | Lim | G06F 17/2765 715/744 |
| 2015/0006564 A1* | 1/2015 | Tomkins | G06F 17/30867 707/767 |
| 2015/0081369 A1* | 3/2015 | Sarrazin | G06Q 10/109 705/7.18 |
| 2018/0067959 A1* | 3/2018 | Sorvillo | G06F 17/30112 |

FOREIGN PATENT DOCUMENTS

| | | |
|---|---|---|
| JP | 2009-205199 A | 9/2009 |
| JP | 2011-237996 A | 11/2011 |

\* cited by examiner

FIG.7

CALENDAR EVENT INFORMATION (ELECTRONIC CALENDAR OF 2013) [68]

| DATE | TIME | WORD (EVENT NAME) | BODY TEXT (DETAILS OF EVENT) |
|---|---|---|---|
| 1/1 | 10:00 | first shrine visit | ○○shrine |
| ⋮ | ⋮ | ⋮ | ⋮ |
| 4/20 | 18:30 | soccer | ○○ball game field △△vs× × |
| 5/1 | 19:00 | concert | ○○hall △△fill |
| ⋮ | ⋮ | ⋮ | ⋮ |
| 5/8 | 10:00 | conference | project of ○○ product |
| | 19:00 | soccer | ○○ball game field △△vs× × |
| ⋮ | ⋮ | ⋮ | ⋮ |
| 5/15 | 18:30 | drinking party | △△bar in front of ○○station |
| ⋮ | ⋮ | ⋮ | ⋮ |

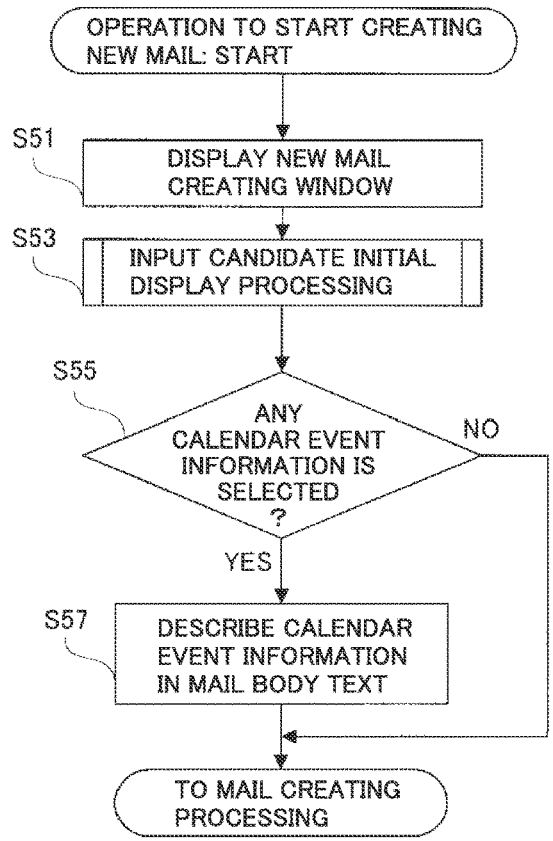
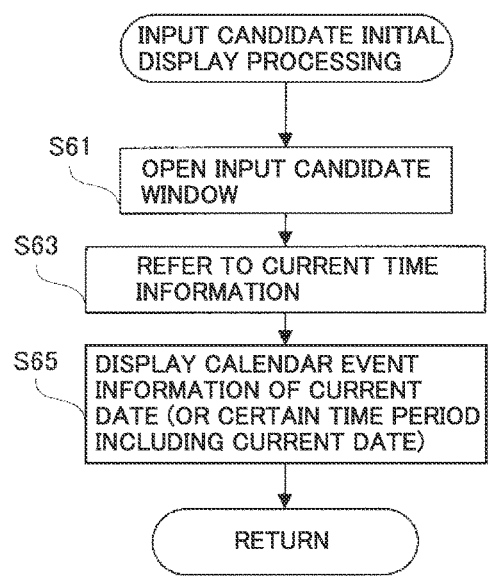

FIG.15A

```
BROWSE              2013/5/1  16:14
RECEIVED MAIL
  SENDER: ****@***.ne.jp
  TITLE:

Do you have any schedule
  in the morning of 5/8?

B1a (REPLY) (DETERMINE) (CONVERT)
```

FIG.15B

```
CREATE              2013/5/1  16:14
REPLY MAIL
C1  TO: ****@***.ne.jp
C2  TITLE:           5/8 10:00 conference   Wn
                     5/8 19:00 soccer
C3  <Do you have any schedule
    in the morning of 5/8?>

KB (SEND) (DETERMINE) (CONVERT)
    B1    B2         B3
```

FIG.15C

```
CREATE              2013/5/1  16:14
REPLY MAIL
  TO: ****@***.ne.jp
  TITLE: Re< >

<Do you have any schedule
  in the morning of 5/8?>
  5/8 10:00 conference
  project of ○○product|

(SEND) (DETERMINE) (CONVERT)
```

FIG.16A

BROWSE RECEIVED MAIL — 2013/5/1 16:14

SENDER: **@*.ne.jp

TITLE: confirm schedule

Shall we watch the soccer game together?

B1a (REPLY) (DETERMINE) (CONVERT)

FIG.16B

CREATE REPLY MAIL — 2013/5/1 16:14

C1 — TO: **@*.ne.jp
C2 — TITLE:    4/20 18:30 soccer
                5/8 19:00 soccer   — Wn
C3 — <Shall we watch the soccer game together?>

KB (SEND) (DETERMINE) (CONVERT)
  B1      B2         B3

FIG.16C

CREATE REPLY MAIL — 2013/5/1 16:14

TO: **@*.ne.jp

TITLE: Re<confirm schedule>

<Shall we watch the soccer game together?>

5/8 19:00 soccer
○○ball game field
△△vs××

(SEND) (DETERMINE) (CONVERT)

FIG.19A

BROWSE RECEIVED MAIL — 2013/5/1 16:14

SENDER: **@*.ne.jp

TITLE: confirm schedule

Shall we watch the soccer game together?

B1a (REPLY) (DETERMINE) (CONVERT)

FIG.19B

CREATE REPLY MAIL — 2013/5/1 16:14

C1 — TO: **@*.ne.jp
C2 — TITLE:    5/8 19:00 soccer    Wn
C3 — <Shall we watch the soccer game together?>

KB (SEND) (DETERMINE) (CONVERT)
  B1     B2         B3

FIG.19C

CREATE REPLY MAIL — 2013/5/1 16:14

TO: **@*.ne.jp

TITLE: Re<confirm schedule>

<Shall we watch the soccer game together?>

5/8 19:00 soccer
○○ball game field
△△vs××

(SEND) (DETERMINE) (CONVERT)

INFORMATION PROCESSING APPARATUS AND MAIL CREATING METHOD

CROSS-REFERENCE TO RELATED APPLICATION

The present application is a continuation based on PCT Application No. PCT/JP2014/072401 filed on Aug. 27, 2014, which claims the benefit of Japanese Application No. 2013-176558, filed on Aug. 28, 2013. PCT Application No. PCT/JP2014/072401 is entitled "Information Processing Device, and E-Mail Generation Method", and Japanese Application No. 2013-176558 is entitled "Information Processing Apparatus and Mail Creating Program and Method". The content of which are incorporated by reference herein in their entirety.

FIELD

The present disclosure relates to an information processing apparatus and a mail creating method.

BACKGROUND

In conventional apparatuses of this kind, when information (calendar event information) such as a date-time and a word indicating an event (event name) held on that date-time is registered to an electronic calendar, a user sometimes copies necessary information therefrom and pastes it on an electronic mail.

In an input supporting method according to one example of background art, when a memo (a document to be registered to a scheduler or the like) is created based on a content of a received electronic mail (received mail), a character string related to a date-time (for example, "next day") is specified from a body text included in the received mail, and an input candidate related to the date-time (for example, "March 11") is estimated from the specified character string and the received date-time of the electronic mail (for example, "March 10"), and then the estimated input candidate is presented.

SUMMARY

An information processing apparatus of one embodiment is an information processing apparatus having an electronic calendar function and an electronic mail function. This information processing apparatus includes a display, an operation unit, and at least one processor. The at least one processor is configured to register calendar event information at including at least any date and time and a word indicating an event held on that date and time to the electronic calendar. The at least one processor is configured to, when a character inputted by the operation unit matches with at least one of a date and time or a word included in the registered calendar event information, display calendar event information including the matched date and time or the matched word on the display as an input candidate. The at least one processor is configured to, when any calendar event information displayed as the input candidate is selected by the operation unit, describe the selected calendar event information in the electronic mail.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4A represents a situation in which, when an inputted character string matches with a date-time registered to an electronic calendar, calendar event information including that date is displayed as an input candidate, and FIG. 4B represents a situation in which the calendar event information selected from the input candidate is described in a mail, and FIG. 4C represents a situation in which whether to attach the selected calendar event information to the electronic mail in a predetermined format is inquired, and FIG. 4D represents a situation in which a character string is further inputted with the virtual keyboard.

FIG. 5A represents a situation in which, when an inputted character string matches with a word registered to an electronic calendar, calendar event information including that word is displayed as an input candidate, and FIG. 5B represents a situation in which the calendar event information selected from the input candidate is described in a mail, and FIG. 5C represents a situation in which whether to attach the selected calendar event information to the electronic mail in a predetermined format is inquired, and FIG. 5D represents a situation in which a character string is further inputted with the virtual key board.

FIG. 7 is an illustration diagram representing one example of calendar event information stored in a main memory.

FIG. 11A represents a situation in which a date is displayed while excluding calendar event information of a prior date, and FIG. 11B represents a situation in which calendar event information selected from an input candidate is described in a mail, and FIG. 11C represents a situation in which whether to attach the selected calendar event information to the electronic mail in a predetermined format is inquired, and FIG. 11D represents a situation in which a character string is further inputted with the virtual keyboard.

FIG. 12A represents a situation in which calendar event information within a predetermined period from a current date is displayed as an input candidate at the time when an operation to start creating a new mail is performed, and FIG. 12B represents a situation in which calendar event information selected from the input candidate is described in a new mail, and FIG. 12C represents a situation in which a character string is further inputted with the virtual keyboard.

FIG. 13 is a flowchart representing mail creating processing corresponding to FIG. 12.

FIG. 14 is a flowchart representing input candidate initial display processing included in the mail creating processing of FIG. 13.

FIGS. 15A to 15C are an illustration diagram representing in time series an example of changes of the touch screen in a third example, where FIG. 15A represents a situation in which an operation to start creating a reply mail to a received mail is performed, and FIG. 15B represents a situation in which calendar event information including the date-time described in the received mail is displayed as an input candidate for the reply mail, and FIG. 15C represents a situation in which the calendar event information selected from the input candidate is described in the reply mail.

FIGS. 16A to 16C are an illustration diagram representing another example of changes of the touch screen in the third example, where FIG. 16A represents a situation in which an operation to start creating a reply mail to another received mail is performed, and FIG. 16B represents a situation in which calendar event information including a word described in the received mail is displayed as an input candidate for a reply mail, and FIG. 16C represents a situation in which the calendar event information selected from the input candidate is described in the reply mail.

FIGS. 19A to 19C are an illustration diagram representing a modification of the input candidate display processing (FIGS. 16A to 16C) in the case where a reply mail to a received mail in which a word is described is created, where FIG. 19A represents a situation in which the operation to start creating a reply mail to a received mail is performed which is the same as that of FIG. 16, and FIG. 19B represents a situation in which, when calendar event information including the word described in the received mail is displayed as an input candidate for the reply mail, calendar event information having a prior date-time is excluded, and FIG. 19C represents a situation in which the calendar event information selected from the input candidate is described in the reply mail.

DETAILED DESCRIPTION

Even if the input supporting method of one example of the background art is applied to a conventional electronic mail creating device, when an electronic mail as a reply (reply mail) to a received mail is created, information which is likely to be inputted is merely presented as an input candidate by specifying a character string related to a date-time from a body text of a received mail and estimating an input candidate related to the date-time based on the specified character string and a received date-time of the received mail. This may possibly reduce the number of operation steps, but is limited to the case of creating a reply mail to a received mail in which a character string related to a date-time is described in a body text. Moreover, even at the time of creating a reply mail or at the time of creating a new mail, many operation steps are still required to select necessary calendar event information and post it to or copy and paste the same to an electronic mail, thus there is no change in the point that the efficiency is not good.

The present disclosure solves the problem described above.

Hereinafter, embodiments will be described with reference to the drawings.

Figure 1:
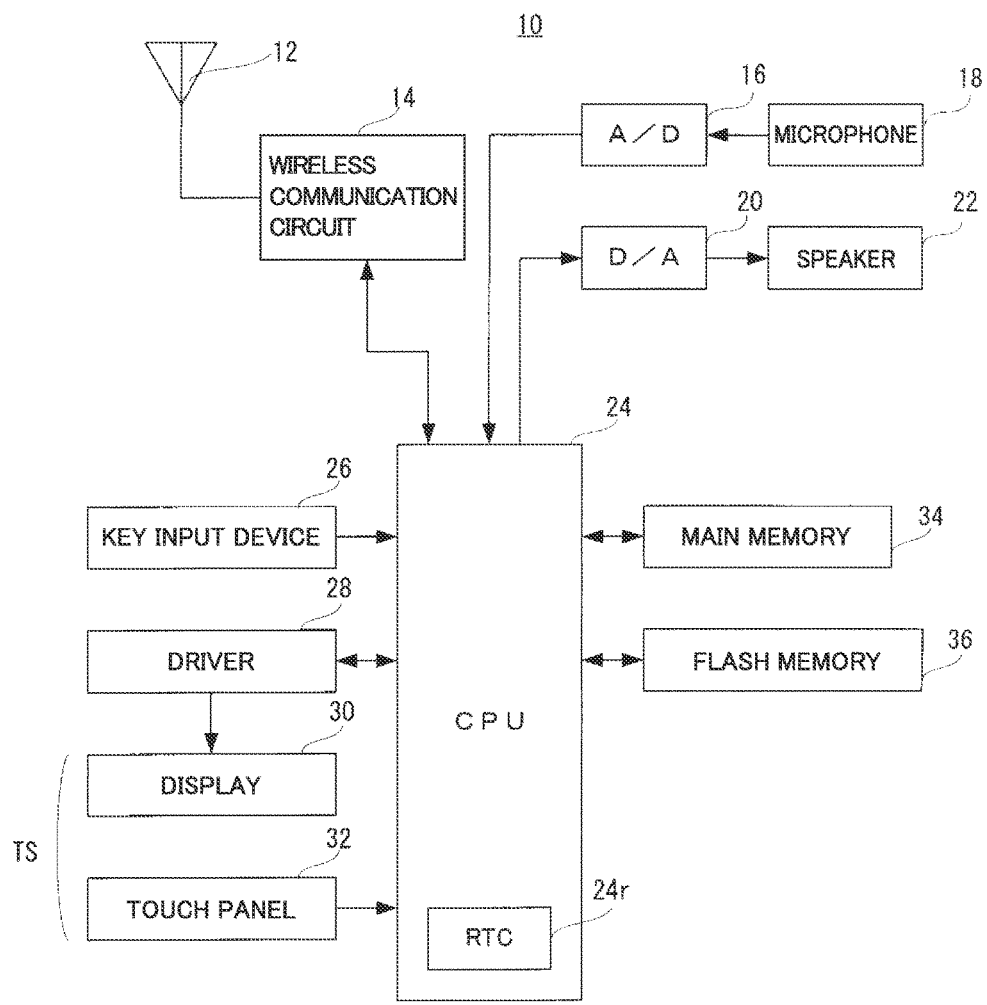
FIG. 1 is a block diagram representing an electric configuration of a mobile terminal of a first example.
Figure 2:
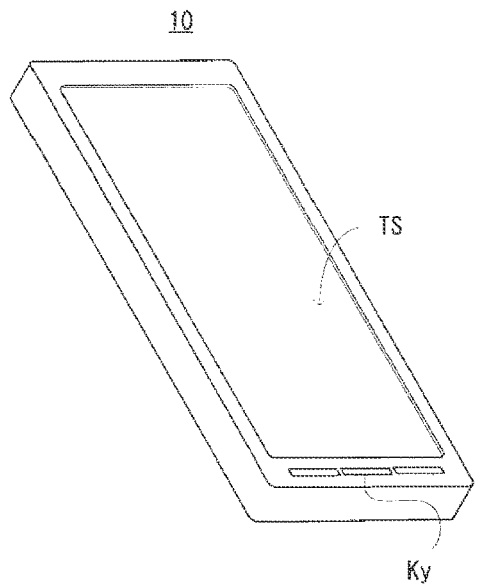
FIG. 2 is an illustration diagram representing an external appearance of a mobile terminal (a touch screen and keys operated by a user).

FIG. 1 represents a hardware configuration of a mobile terminal 10 in accordance with one example. FIG. 2 represents an external appearance of mobile terminal 10. Mobile terminal 10 includes a kind of digital processing circuitry, and includes a central processing unit (CPU), a digital signal processor (DSP), and various digital circuits. Referring to FIGS. 1 and 2, mobile terminal 10 includes a CPU 24. CPU 24 connects with a key input device 26, a touch panel 32, a main memory 34, and a flash memory 36. Further, CPU 24 connects with an antenna 12 through a wireless communication circuit 14, with a microphone 18 through an A/D converter 16, with a speaker 22 through a D/A converter 20, and with a display 30 through a driver 28, respectively.

Antenna 12 can capture (receive) a radio signal from a base station which is not illustrated in the drawings, and emit (transmit) a radio signal from wireless communication circuit 14. Wireless communication circuit 14 can demodulate and decode a radio signal received by antenna 12, and encode and modulate a signal from CPU 24. Microphone 18 can convert sound waves into an analog sound signal. A/D converter 16 can convert the sound signal from microphone 18 into digital sound data. D/A converter 20 can convert the sound data from CPU 24 into an analog sound signal, and speaker 22 can convert the sound signal from D/A converter 20 into sound waves.

Key input device 26 is constituted of various keys (Ky: FIG. 2), buttons (not illustrated), and the like operated by a user, and can input a signal (command) corresponding to an operation into CPU 24. Frequently used functions such as "display a home (standby) image," "display a menu image," "return," and the like are allocated to keys Ky.

Driver 28 can display an image in accordance with a signal from CPU 24 on display 30. Touch panel 32 is provided on a display surface of display 30 and can input a signal indicating a touched point (X, Y coordinates) to CPU 24. For example, in a state where a standby image (not illustrated) is displayed on display 30, when a user performs an operation of touching any item (icon) on the standby image, coordinates of the touched point are detected by touch panel 32. Accordingly, CPU 24 can determine which item is selected by a user.

It should be noted that, in the following description, display 30 provided with touch panel 32 having a function of displaying an image and receiving a touch operation to the displayed image is referred to as "touch screen" (TS: FIG. 2) appropriately.

Main memory 34 is constituted of, for example, an SDRAM (Synchronous Dynamic Random Access Memory), and can store a program, data, and the like (refer to FIG. 6) for allowing CPU 24 to execute various processing and can provide a necessary working region to CPU 24. Flash memory 36 is constituted of, for example, a NAND type flash memory, and is used as a storage region for a program, data, and the like.

Under the control by programs (52-56) stored in main memory 34, CPU 24 can execute various processing while utilizing other hardware (12-22, 26-36).

In mobile terminal 10 configured as described above, by touching one of icons or menu items, which are not shown in the drawings, displayed on touch screen TS, selection of a phone call mode for making a phone call, a mail transmission/reception mode for transmission/reception of an electronic mail, an application processing mode for executing application processing, and the like can be performed.

When the phone call mode is selected, mobile terminal 10 can function as a phone call device. Specifically, when a calling operation is performed by means of virtual numerical keys and the like displayed on touch screen TS, CPU 24 can control wireless communication circuit 14 to output a calling signal. The outputted calling signal can be outputted through antenna 12 and transmitted to a telephone of a called person through a mobile communication network which is not illustrated in the drawings. The telephone can start calling by means of incoming sounds and the like. When the called person performs a call receiving operation, CPU 24 can start phone call processing. On the other hand, when a calling signal from the called person is captured by antenna 12, wireless communication circuit 14 notifies CPU 24 of an incoming call, and CPU 24 can start calling by means of incoming sounds through speaker 22 or vibration of a vibrator which is not illustrated in the drawings. When the call receiving operation is performed by means of an answer button and the like displayed on touch screen TS, CPU 24 can start phone call processing.

The phone call processing can be performed, for example, as follows. The call receiving sound signal transmitted from the called person is captured by antenna 12, demodulated and decoded by wireless communication circuit 14, and thereafter given to speaker 22 through D/A converter 20. Accordingly, incoming call sounds can be outputted from speaker 22. On the other hand, an outgoing call sound signal taken in by microphone 18 is transmitted to wireless communication circuit 14 through A/D converter 16, encoded and decoded by wireless communication circuit 14, and thereafter transmitted to the called person through antenna 12. Also on a telephone of the called person, demodulation and decoding of the outgoing call sound signal are performed, so that the outgoing call sounds can be outputted.

When the electronic mail transmission/reception mode is selected, mobile terminal 10 can function as a mail transmission/reception device. Specifically, address information of a mail server (not shown) on the internet is stored in flash memory 36, and CPU 24 can perform data communication with the electronic mail server through wireless communication circuit 14 to download a received mail directed to mobile terminal 10 and upload an outgoing mail created by means of a mail creating application (which will be described later).

When the application processing mode is selected, mobile terminal 10 can function as an information processing apparatus which executes applications for management of an electronic calendar, creation of an electronic mail, and the like.

Figure 6:
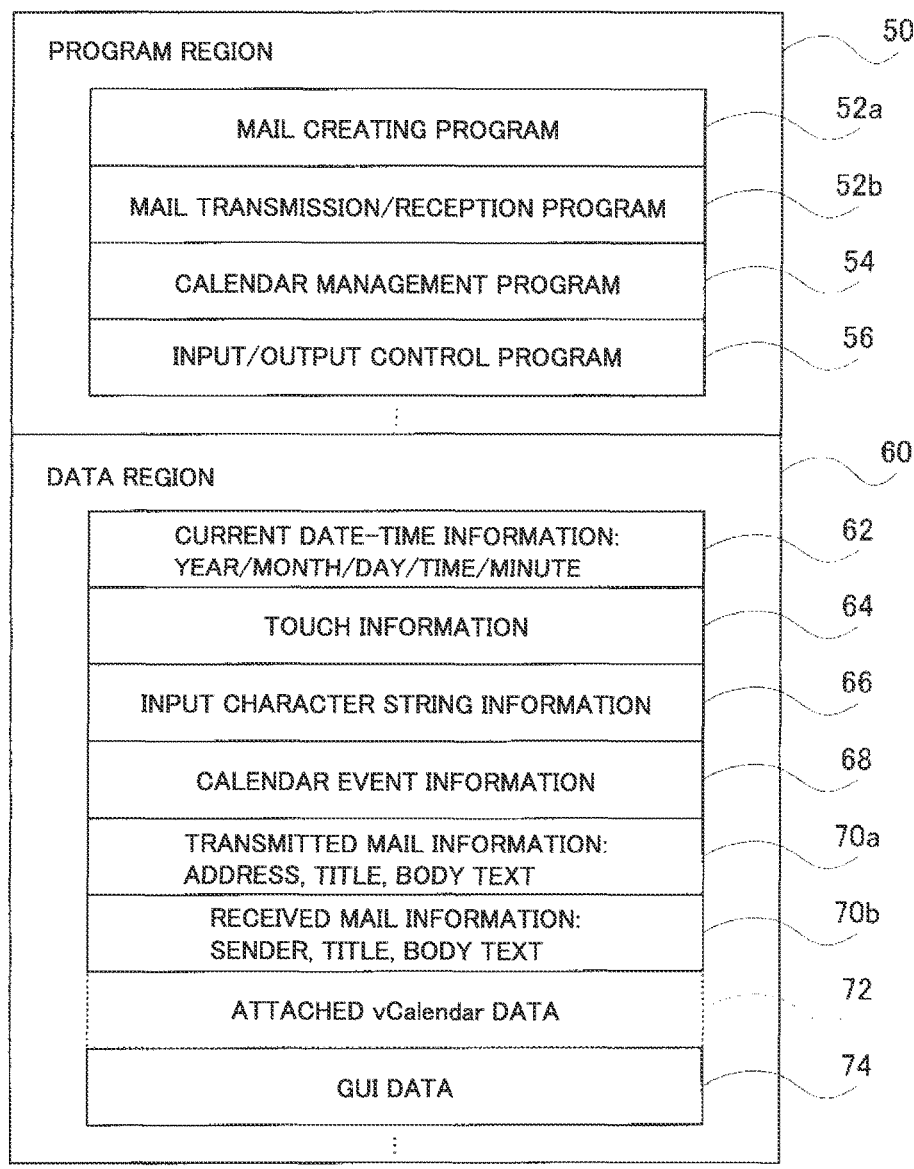
FIG. 6 is a memory map diagram representing contents of a main memory of the mobile terminal.

Specifically, when an application for performing management of an electronic calendar (calendar management application) is executed, CPU 24 can read out a part or all of an electronic calendar (not illustrated) stored in flash memory 36 to main memory 34 and display a calendar screen (not illustrated) based on this on display 30 through driver 28. Based on the operation to touch screen TS, CPU 24 can register calendar event information including a date and time (date-time) on which an event is held, a word indicating the event (event name), and a body text indicating a detail of the event, for example, calendar event information 68 as shown in FIGS. 6 and 7 to the electronic calendar.

It should be noted that calendar event information 68 of FIG. 7 is registered to an electronic calendar for the year 2013, and it can include a plurality of calendar event information such as "1/1 10:00 first shrine visit ∘∘ shrine," "4/20 18:30 soccer ∘∘ ball game field ΔΔ vs xx," and the like.

Figure 3:
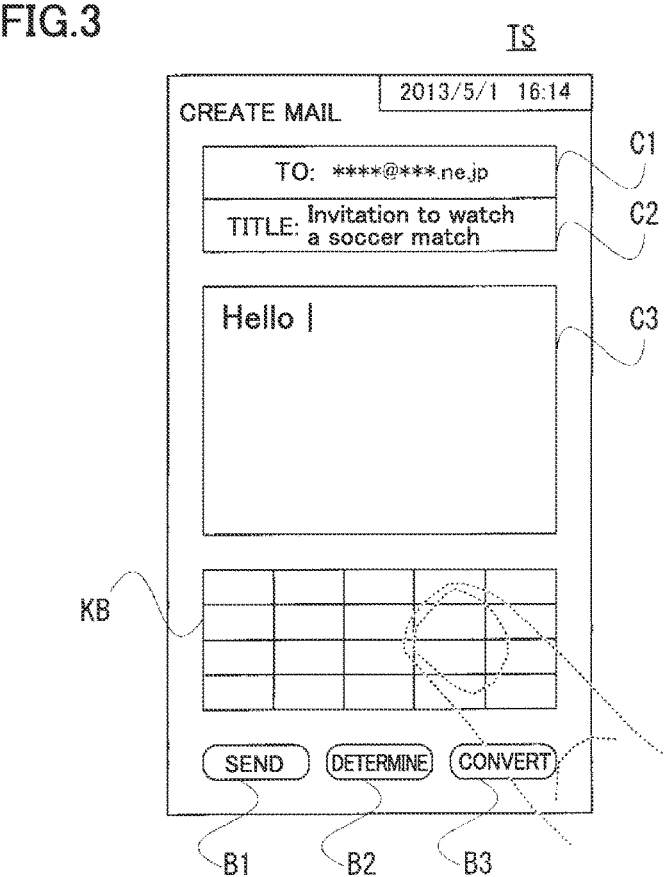
FIG. 3 is an illustration diagram representing one example of the touch screen during creation of a mail, and represents a situation in which a character string is inputted with a virtual keyboard.

When the application for creating an electronic mail (mail creating application) is executed, CPU 24 can display a mail creating screen as shown in FIG. 3 on display 30 through driver 28. In other words, touch screen TS takes a form of a mail creating screen as shown in FIG. 3. On the electronic mail creating screen of FIG. 3, a virtual keyboard KB for inputting a character string (generally constituted of a plurality of characters, but may be a single character; this similarly applies to the following paragraphs) indicating an electronic mail address (for example, "**@*.ne.jp"), a title (for example, "invitation to watch a soccer match"), and a body text (for example, "hello . . . "), display columns in which an inputted address, a title, and body text (for example, an address display column C1, a title display column C2, and a body text display column C3) are displayed, and virtual buttons for inputting commands such as transmission, determination, and conversion (for example, a transmission button B1, a determination button B2, and a conversion button B3) are arranged, and also a current date-time (for example, "2013/5/1 16:14") is displayed.

Particularly, the electronic mail creating application in this example can cooperate with the calendar management application and create an electronic mail with reference to the electronic calendar. Specifically, when the character string inputted with virtual keyboard KB on the electronic mail creating screen matches with a date-time or a word included in calendar event information 68 registered to the electronic calendar, CPU 24 opens an input candidate window (Wn: for example, FIG. 4A) and can display calendar event information including the matched date-time or the matched word. Then, when a user selects desired calendar event information from input candidate window Wn by the touch operation, CPU 24 can describe the selected calendar event information in an electronic mail (for example, FIG. 4B).

When a date-time or a word included in calendar event information 68 registered in advance to the electronic calendar is inputted with virtual keyboard KB, the electronic mail creating application of this example can display calendar event information including the inputted date-time or the inputted word as an input candidate. When a desired input candidate is selected from the displayed input candidate, the electronic mail creating application of this example can describe the selected calendar event information in an electronic mail. Accordingly, a user is not required to select necessary calendar event information from a large amount of calendar event information and post it to or copy and paste it in an electronic mail. Consequently, the number of operation steps can be reduced significantly.

Hereinafter, specific examples will be described in detail with reference to FIGS. 4A to 4D and 5A to 5D. FIGS. 4A to 4D represent in time series an example of changes of touch screen TS (shifting of the electronic mail creating screen in the case where a date-time is inputted) following FIG. 3. FIGS. 5A to 5D represent in time series another example of changes of touch screen TS (shifting of the electronic mail creating screen in the case where a word is inputted) following FIG. 3.

Figure 4A:
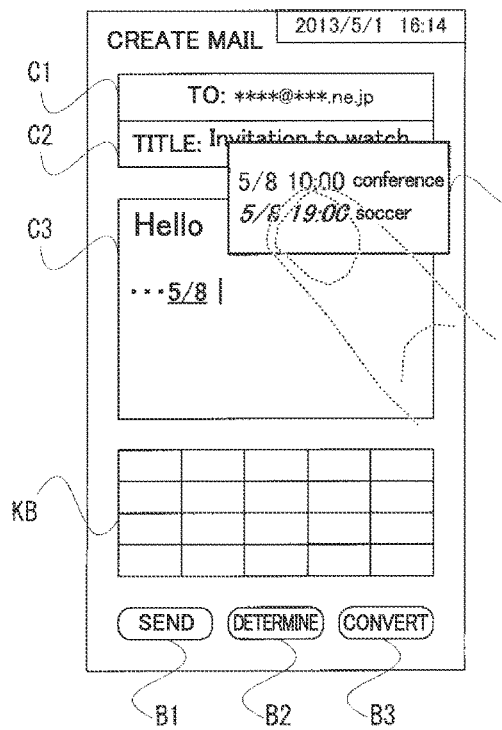
FIGS. 4A to 4D are an illustration diagram representing in time series an example of changes in the touch screen following FIG. 3, where
Figure 4B:
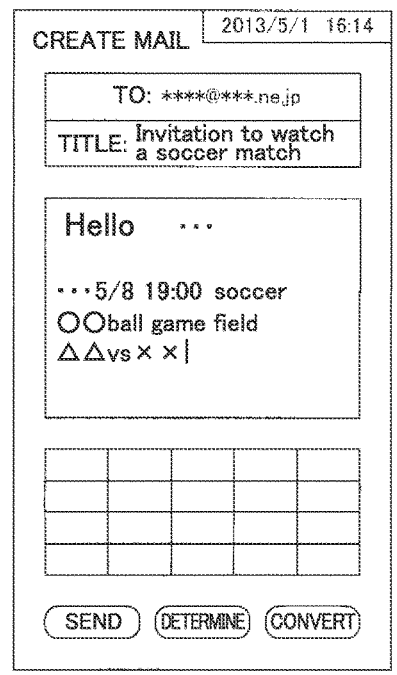

Firstly, with reference to FIGS. 4A to 4D, when a user inputs a character string indicating a date-time, for example, "5/8" with virtual keyboard KB, this character string is displayed on body text display column C3 and compared with calendar event information 68 registered in advance (FIG. 7). As a result of comparison, since there exists calendar event information including "5/8" (in this example, two items), as shown in FIG. 4A, input candidate window Wn is opened, and calendar event information including "5/8" (except for a body text), specifically, "5/8 10:00 conference" and "5/8 19:00 soccer" are displayed therein. It should be noted that, since "5/8," in other words, the date is already displayed in body text display column C3, only a time and a word may be displayed on input candidate window Wn.

Next, when a user touches "5/8 19:00 soccer" in input candidate window Wn to select it, the selected calendar event information (date-time, word, and body text), in other words, "5/8 19:00 soccer ○○ ball game field ΔΔ vs xx" is displayed on body text display column C3 and described in a body text of an electronic mail. It should be noted that, at the time when selection from input candidate window Wn is performed, only displaying on body text display column C3 may be performed, and description to a mail body text may be performed in accordance with a subsequent confirmation operation (pressing determination button B2).

Figure 4C:
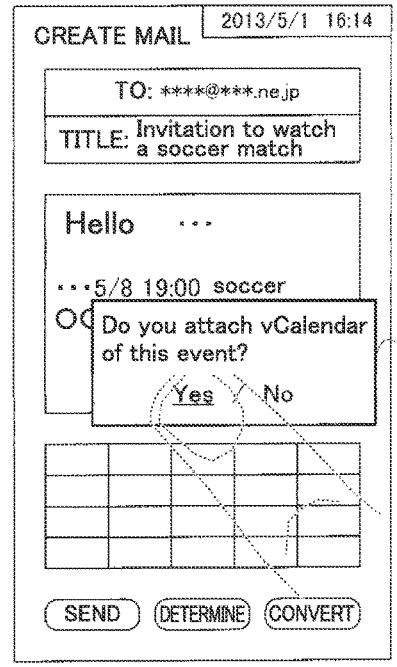

After that, as shown in FIG. 4C, a dialog Dg such as "Do you attach vCalendar of this event? Yes/No" is displayed. When "Yes" is selected, the calendar event information is attached to an electronic mail in a vCalendar format. If the calendar event information is attached in the vCalendar format, the attached calendar event information can be readily registered (without inputting a character string with virtual keyboard KB) to an electronic calendar of a mobile terminal which has received the electronic mail.

Figure 4D:
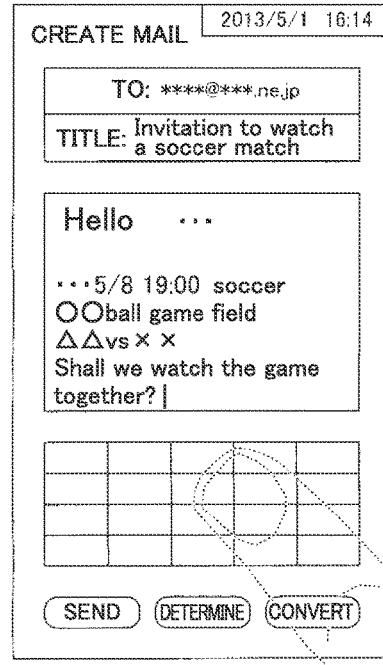

Subsequently, when a user inputs an additional character string, for example, "Shall we watch the game together?" with virtual keyboard KB, as shown in FIG. 4D, that character string is displayed on body text display column C3 and described in the body text of the electronic mail. After the electronic mail is created, when a user presses transmission button B1, the electronic mail is transmitted.

Figure 5A:
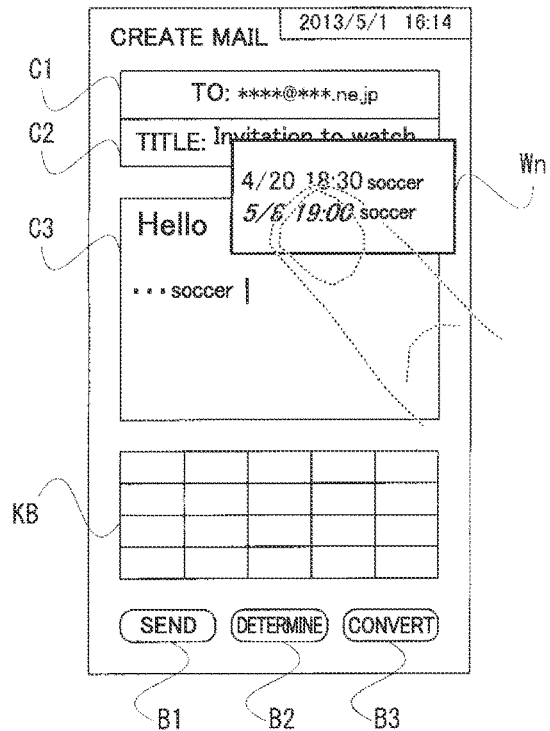
FIGS. 5A to 5D are an illustration diagram representing in time series another example of changes in the touch screen following FIG. 3, where

Next, referring to FIGS. 5A to 5D, also when a user inputs a word, in other words, a character string such as "soccer" indicating an event with virtual keyboard KB, this character string is displayed on body text display column C3 and compared with calendar event information registered in advance (FIG. 7). As a result of comparison, since there exists calendar event information including "soccer" (in this example, two items), as shown in FIG. 5A, input candidate window Wn is opened, and calendar event information including "soccer" (except for a body text), specifically, "4/20 18:30 soccer" and "5/8 19:00 soccer" are displayed therein. It should be noted that, since "soccer," in other words, a word is already displayed on body text display column C3, only a date-time may be displayed on input candidate window Wn.

Figure 5B:
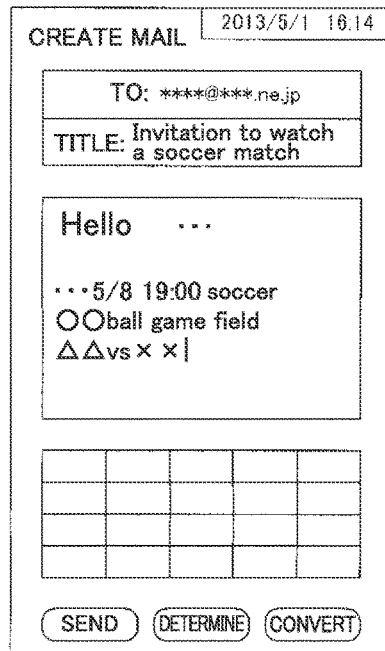

Next, when a user touches "5/8 19:00 soccer" in input candidate window Wn to select it, the selected calendar event information (a date-time, a word, and a body text), in other words, "5/8 19:00 soccer ○○ ball game field ΔΔ vs xx" is displayed on body text display column C3 and described in a body text of an electronic mail as shown in FIG. 5B. Subsequent processing is the same as the one described above.

Figure 5C:
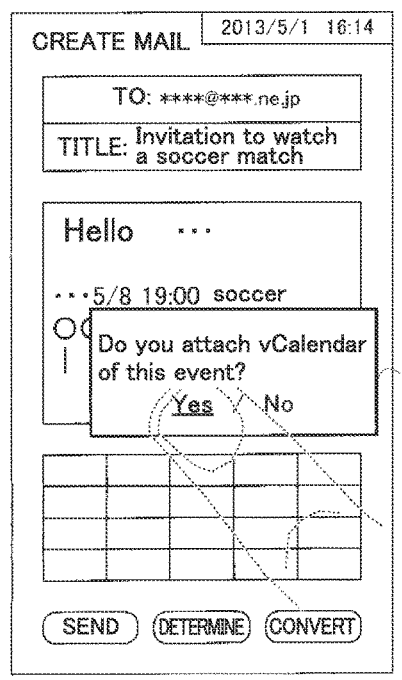
Figure 5D:

As shown in FIG. 5C, when dialog Dg such as "Do you attach a vCalendar of this event? Yes/No" is displayed. When "Yes" is selected, the calendar event information is attached to an electronic mail in the vCalendar format. When a user further inputs a character string with virtual keyboard KB, as shown in FIG. 5D, the character string is displayed on body text display column C3 and described in the body text of the electronic mail. Then, when the user presses transmission button B1, the electronic mail is transmitted.

Figure 8:
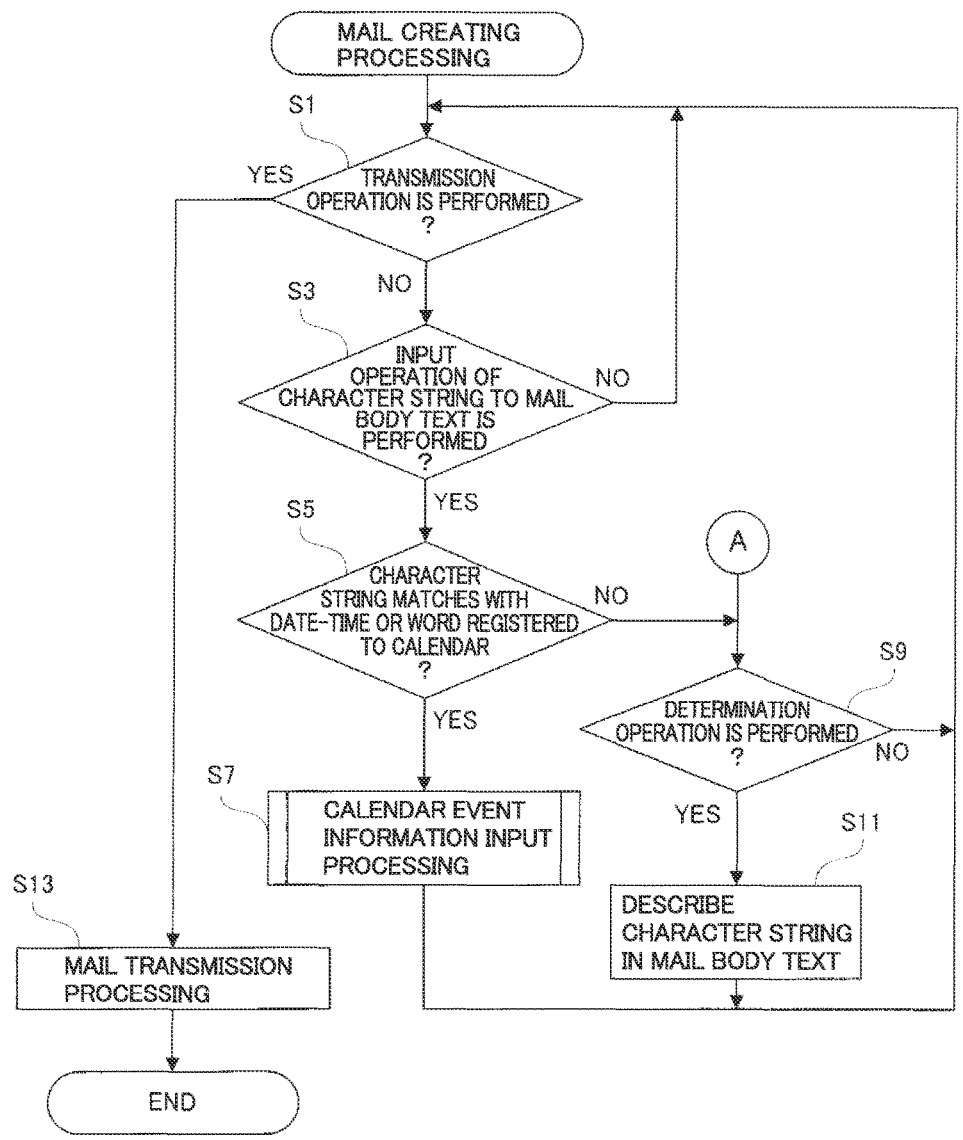
FIG. 8 is a flowchart representing one example of mail creating processing executed by a CPU (Central Processing Unit) of the mobile terminal.
Figure 9:
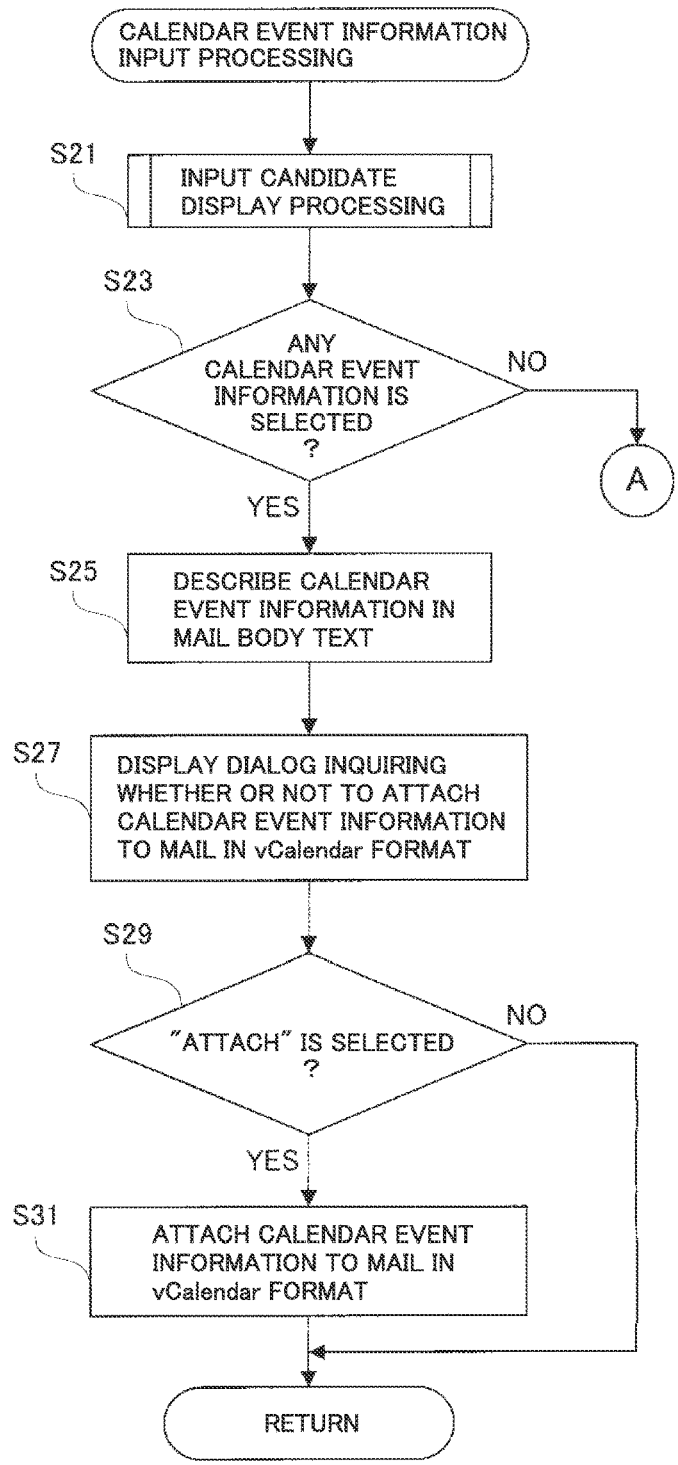
FIG. 9 is a flowchart representing a detail of calendar event information processing included in the mail creating processing.
Figure 10:
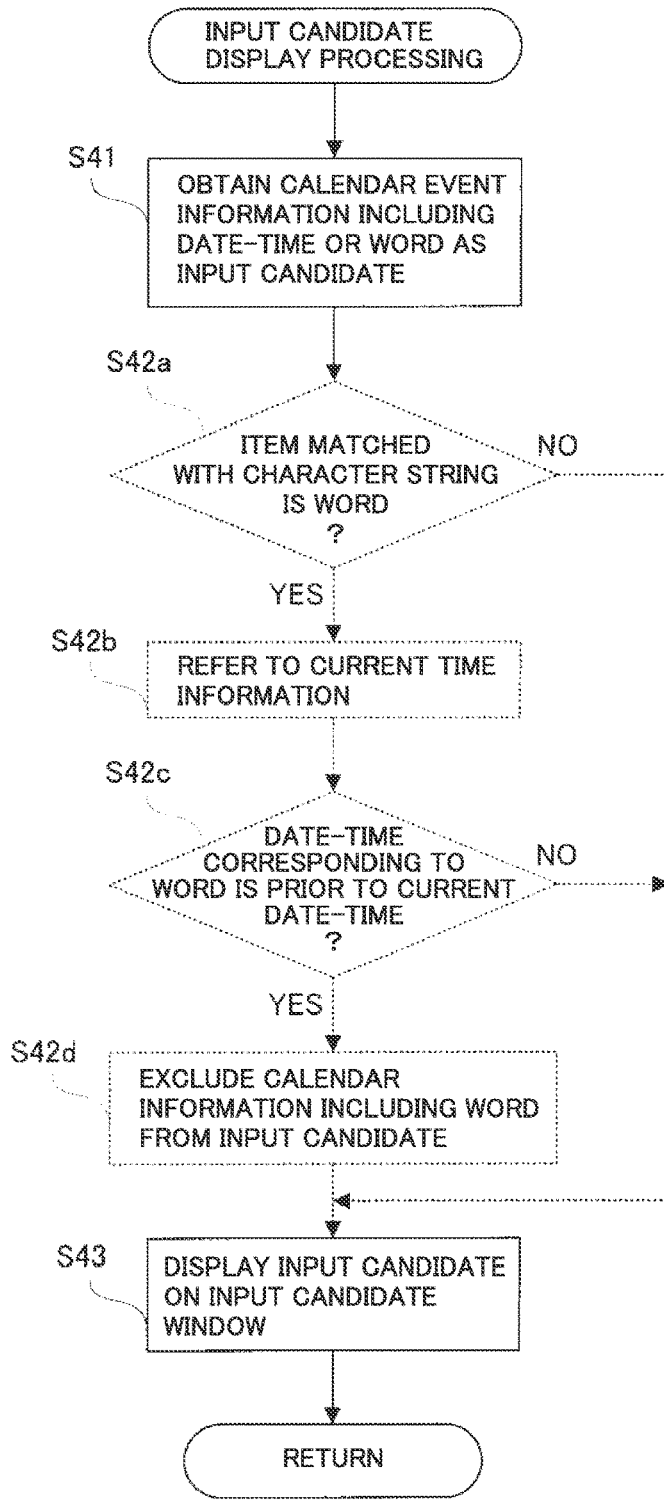
FIG. 10 is a flowchart representing a detail of input candidate display processing included in the calendar event information input processing.

The mail creating processing as described above is achieved by CPU 24 executing the processing in accordance with the flowcharts shown in FIGS. 8 to 10 based on, for example, various programs and data stored in main memory 34 and shown in FIGS. 6 and 7.

Specifically, firstly with reference to FIG. 6, main memory 34 can include a program region 50 and a data region 60. Program region 50 can store a mail creating program 52a, a mail transmission/reception program 52b, a calendar management program 54, an input/output control program 50, and the like. Data region 60 can store current date-time information 62, touch information 64, input character string information 66, calendar event information 68, transmitted mail information 70a, received mail information 70b, attached vCalendar information 72, GUI data 74, and the like.

It should be noted that, although illustration is omitted, program region 50 can also store various control programs for achieving the phone call mode described above.

Mail creating program 52a is a program which cooperates with calendar management program 54 to allow CPU 24 to execute mail creating processing shown in FIGS. 8 to 10. Mail transmission/reception program 52b is a program which allows CPU 24 to execute transmission processing of an electronic mail (outgoing mail) created by mail creating program 52a and receiving processing of an electronic mail (received mail) created by other mobile terminal (not shown).

Calendar management program 54 is a program which allows CPU 24 to execute processing of registering calendar event information 68 to the electronic calendar, providing calendar event information 68 to mail creating program 52, and the like.

Input/output control program 56 is a program which mainly controls input/output with respect to touch screen TS, in other words, input from touch panel 32 to CPU 24 and output from CPU 24 to display 30. More specifically, under the control by input/output control program 56, CPU 24 can display the electronic mail creating screen as shown in FIG. 3 and the like on display 30 through a driver 28 based on GUI data 74, distinct a state in which a finger or the like is touched on touch panel 32 (touched state) or a state in which nothing is touched (non-touched state) based on a signal from touch panel 32, and detect a touch position in a touched state, in other words, a center coordinate in a region of touch panel 32 where a finger tip is in contact.

Current date-time information 62 is information indicating a current date-time (for example, a year, a month, a day, a time, a minute) and is provided from an RTC (Real Time Clock) 24r provided in CPU 24. Touch information 64 is information indicating a result of distinction of a touched/non-touched state by input/output control program 56 and a touched position in the touched state. Input character string information 66 is information inputted in real time with virtual keyboard KB of the electronic mail creating screen shown in FIG. 3 and the like and indicating a character string which has not been decided, and it is described in an electronic mail (transmitted mail information 70a) in accordance with a confirmation operation (pressing determination button B2, or the like).

Calendar event information 68 is information registered to the electronic calendar by calendar management program 54 and referred by mail creating program 52a, and it can be constituted of, as shown in FIG. 7, a date and a time (date-time) on which an event is held, a word indicating the event (event name), and a body text indicating a detail of the event.

Transmitted mail information 70a is information of an electronic mail created by mail creating program 52a and transmitted by mail transmission/reception program 52b (a new mail, or a reply mail with respect to a received mail), and can be constituted of an address, a title, and a body text. Received mail information 70b is information of an electronic mail created by other mobile terminal and the like and received by mail transmission/reception program 52b, and can be constituted of a sender, a title, and a body text.

Attached vCalendar data 72 is data attached to an outgoing mail and created by converting calendar event information described in a body text of transmitted mail information 70a into a vCalendar format which can be registered to the electronic calendar. GUI data 74 is data for displaying the electronic mail creating screen and the like of FIG. 3 on display 30 through driver 28.

FIG. 8 shows a flowchart of the mail creating processing executed by CPU 24. FIG. 9 shows a detailed flowchart of the calendar event input processing included in the mail creating processing of FIG. 8. FIG. 10 shows a detailed flowchart of the input candidate processing included in the calendar event input processing of FIG. 9.

Referring to FIG. 8, firstly in step S1, CPU 24 can determine whether or not a transmission operation (operation of pressing transmission button B1) is performed based on touch information 64. If it is YES in step S1, the processing proceeds to step S13, and CPU 24 can execute electronic mail transmission processing (processing of cooperating with mail transmission/reception program 52b to transmit an electronic mail based on transmitted mail information 70a from wireless communication circuit 14) and thereafter terminate this processing.

If it is NO in step S1, the processing proceeds to step S3, and CPU 24 can determine whether or not a character input operation to a mail body text (body text display column C3) is performed based on touch information 64 and input character string information 66. If it is NO also in step S3, the processing returns to step S1, and the same processing is repeated after a predetermined standby time period. When CPU 24 detects an operation of pressing virtual keyboard KB from touch information 64, and input character string information 66 is updated based on the detection result, CPU 24 determines that it is YES in step S3, and the processing proceeds to step S5.

In step S5, CPU 24 can determine whether or not a character string indicated by input character string information 66 matches with a date-time or a word registered in the electronic calendar. More specifically, when there is even one date or word which matches with the input character string in the date-time and word included in calendar event information 68, CPU 24 determines that it is YES in step S5, and the processing proceeds to step S7. In step S7, after CPU 24 executes the calendar event information input processing (FIG. 9: described later) as described with reference to FIGS. 4A to 4B and FIGS. 5A to 5B, the processing returns to step S1, and CPU 24 repeats the same processing as described above.

On the other hand, when there is no date or word matching with the input character string in the date-time and word included in calendar event information 68, CPU 24 determines that it is NO in step S5, and the processing proceeds to step S9. In step S9, CPU 24 determines whether or not a confirmation operation (operation of pressing determination button B2) is performed based on touch information 64. If it is determined NO, the processing returns to step S1, and CPU 24 repeats the same processing as described above. If it is YES in step S9, the processing proceeds to step S11, and CPU 24 describes the input character string in a body text of an electronic mail (transmitted mail information 70a) as described with reference to FIGS. 3, 4D, and 5D. After that, the processing returns to step S1, and CPU 24 repeats the same processing as described above.

The calendar event information input processing of step S7 described above can be executed in accordance with the flowchart shown in FIG. 9. Referring to FIG. 9, CPU 24 firstly executes input candidate display processing in step S21. This input candidate display processing is executed in accordance with the flowchart of FIG. 10.

Referring to FIG. 10, in the first step S41, CPU 24 can obtain calendar event information matched with a input character string, in other words, calendar event information including an inputted date-time or an inputted word from the electronic calendar (in other words, CPU 24 can read out calendar event information including the inputted date-time or the inputted word in calendar event information 68 stored in data region 60 and store the same in an internal memory which is not illustrated in the drawings). In next step S43, the display candidate obtained in such a manner can be displayed in input candidate window Wn.

For example, when calendar event information 68 such as the one shown in FIG. 7 is registered in the electronic calendar, and "5/8" is inputted with virtual keyboard KB, as shown in FIG. 4A, two calendar event information including this inputted date-time, in other words, "5/8 10:00 conference" and "5/8 19:00 soccer" can be displayed as input candidates.

Similarly, when "soccer" is inputted, as shown in FIG. 5A, two calendar event information including this inputted word, in other words, "4/20 18:30 soccer" and "5/8 19:00 soccer" can be displayed as input candidates.

After displaying the input candidates in such a manner, the processing of CPU 24 returns to the flowchart of FIG. 9.

Referring back to FIG. 9, next, CPU 24 determines in step S23 whether or not any calendar event information is selected from input candidate window Wn. If it is NO, the processing shifts to step S9 in the flowchart of FIG. 8 and repeats the same processing as the one described above. If it is YES in step S23, the processing proceeds to step S25, and CPU 24 can describe the calendar event information in a body text of transmitted mail information 70a.

In step S27, CPU 24 can display dialog Dg inquiring whether or not to attach the calendar event information in the vCalendar format on display 30 through driver 28. Accordingly, dialog Dg such as "Do you attach vCalendar of this event? Yes/No" shown in FIGS. 4C and 5C is displayed on the electronic mail creating screen.

After that, CPU 24 can determine whether or not "attach" is selected based on touch information 64 in step S29. Specifically, when a touch operation to "No" in dialog Dg of FIGS. 4C and 5C is detected, CPU 24 determines that "attach" is not selected, and the processing returns to the flowchart of FIG. 8. When a touch operation to "Yes" is detected, CPU 24 determines that "attach" is selected, and the processing proceeds to step S31.

In step S31, CPU 24 can attach the calendar event information to an electronic mail in the vCalendar format. Specifically, CPU 24 can convert the calendar event information into the vCalendar format, and store the same in data region 60 as attached vCalendar data 72 which is attached to an electronic mail transmitted based on transmitted mail information 70a. After that, the processing returns to the flowchart of FIG. 8.

As is apparent from the description above, mobile terminal 10 of this example has touch screen TS and CPU 24, and CPU 24 can register calendar event information 68 including any date-time, a word indicating an event held on that date-time (event name), and a body text indicating a detail of the event to the electronic calendar (store in data region 60 of main memory 34) under the control of calendar management program 54.

CPU 24 can execute the following processing under the control of mail creating program 52a. When a character string (input character string information 66) inputted with virtual keyboard KB on touch screen TS matches with a date-time or a word included in calendar event information 68 registered in the electronic calendar, CPU 24 can display calendar event information including the matched date-time or the matched word on touch screen TS as an input candidate (S3:YES→S5:YES→S21). Then, when any calendar event information is selected from the displayed input candidates by a touch operation, CPU 24 can describe the selected calendar event information in an electronic mail (transmitted mail information 70a) (S23:YES→S25).

Thus, when a user inputs a date-time or a word registered in the electronic calendar, calendar event information (date-time and word) including the inputted date-time or the inputted word is displayed as input candidates, so that, by selecting a necessary one from the input candidates displayed in such a manner, the selected calendar event information (date-time, word, and body text) is described in an electronic mail. Accordingly, it would not be necessary to select a necessary one from a large amount of calendar event information and minutely input it with virtual keyboard KB, so that the number of operation steps can be reduced. Thus, an electronic mail can be created efficiently with reference to the electronic calendar.

CPU 24 can attach the selected calendar event information to an electronic mail in the vCalendar format (S31). Thus, a user on a transmission destination of an electronic mail can readily register the calendar event information described in the electronic mail without minutely inputting the same. It should be noted that, although the vCalendar format is employed, any format may be employed as long as it is the format which can be registered to the electronic calendar.

It should be noted that, in the above-described example (first example), when an inputted character string matches with a date-time or a word included in calendar event information 68, CPU 24 displays calendar event information including the matched date-time or the matched word as input candidates. However, when the item matched with the inputted character string is a word, calendar event information including a date-time before a date-time indicated by current date-time information 62 in calendar event information including the matched word may be excluded from the input candidates.

Such a modification is achieved by inserting steps S42a to S42d, indicated by dotted lines, between step S41 and S43 in the above-described flowchart of FIG. 10. Referring to FIG. 10, in step S41, CPU 24 obtains (retains in the internal memory) calendar event information matched with an input character string, in other words, calendar event information including an inputted date-time or an inputted word from the electronic calendar as display candidates. After that, in step S42a, CPU 24 determines whether or not the item matched with the character string is a word. If the determination result in step S42a is NO, in other words, the item matched with the input character string is a date-time, the processing proceeds to step S43.

If the determination result in step S42a is YES, in other words, the item matched with the input character string is a word, CPU 24 can refer to current date-time information 62 in step S42b and determine whether or not the date-time corresponding to the word (the date on which the event indicated by the word is held) is prior to a current date-time. If the determination result in step S42c is NO, in other words, the date-time corresponding to the word is on or after the current date-time, the processing proceeds to step S43.

If the determination result in step S42c is YES, in other words, the date-time corresponding to the word is prior to the current date-time, CPU 24 excludes calendar event information including the word from input candidates in step S42d (in other words, delete the item having a date-time prior to the current date-time in input candidates retained in the internal memory), and thereafter the processing proceeds to step S43.

Thus, in step S43, when the one prior to the current date-time is included in the obtained input candidates, display candidates excluding it is displayed in input candidate window Wn. In other words, calendar event information including a date (which may be a prior date-time, or a date-time on or after the current date-time) matched with the input character string, or calendar event information on or after a current date including a word matched with the input character string is displayed.

Figure 11A:
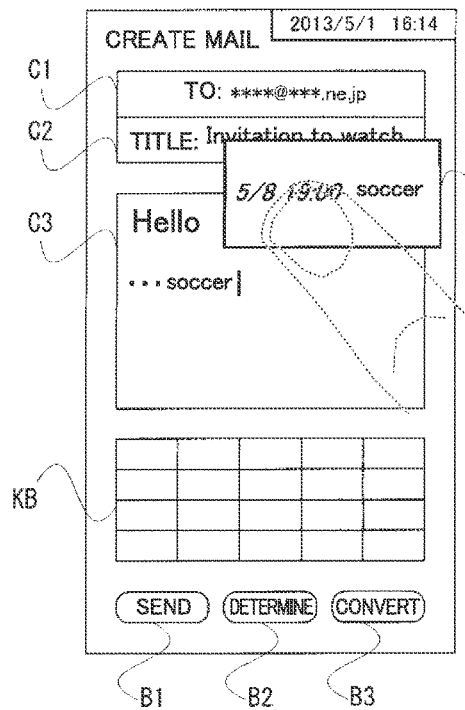
FIGS. 11A to 11D are an illustration diagram representing a modification of the input candidate display processing (FIGS. 5A to 5D) in the case where a character string matches with a word, where

According to this flowchart, when calendar event information 68 like the one shown in FIG. 7 is registered, and "soccer" is inputted, there are two calendar event information including this inputted word: "4/20 18:30 soccer" and "5/8 19:00 soccer." However, since the date-time of the former, in other words, "4/20 18:30" is prior to the current date-time, in other words, "5/1 16:14," the former, in other words, "4/20 18:30 soccer" is excluded from the input candidates in step S42d. Thus, as shown in FIG. 11A, input candidate window Wn consequently displays only the latter, in other words, "5/8 19:00 soccer" in step S43.

Figure 11B:
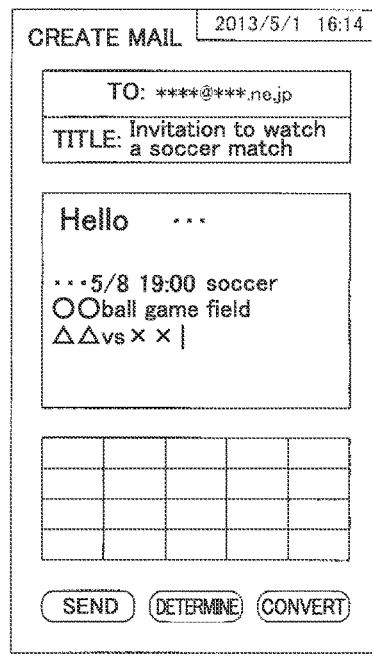
Figure 11C:
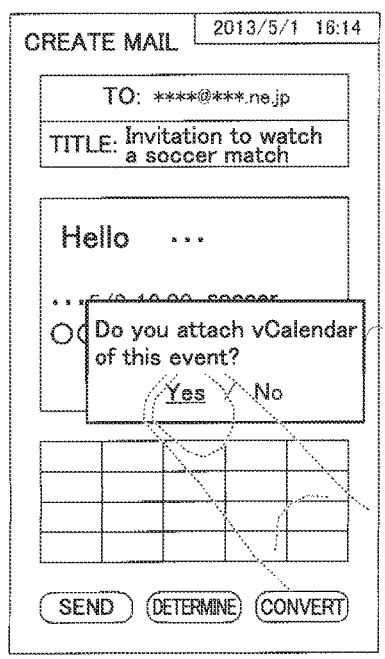
Figure 11D:
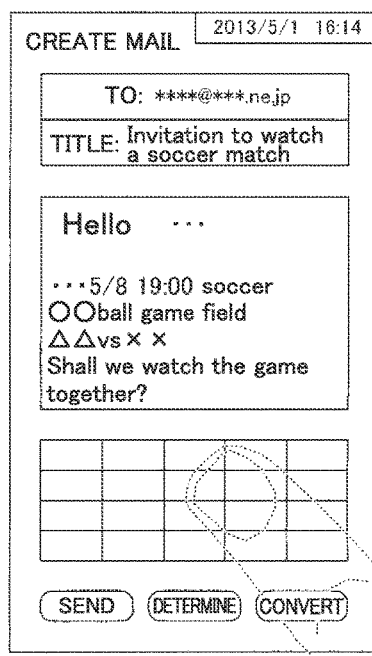

Then, as shown in FIG. 11B, when a user touches "5/8 19:00 soccer," a whole text of this touched calendar event information, in other words, "5/8 19:00 soccer ∘∘ ball game field ΔΔ vs xx" is described in a mail body text. It should be noted that subsequent FIGS. 11C to 11D are the same as FIGS. 4C to 4D or FIGS. 5C to 5D described above.

Accordingly, when a user inputs a word (event name), past calendar event information is excluded from the input candidate, so that displaying of calendar event information with low necessity can be suppressed, and operability is improved. On the other hand, when a user intentionally inputs a past date-time, calendar event information including the date-time is displayed as an input candidate, so that it would not be necessary to minutely input the calendar event information, and the number of operation steps is reduced. Thus, the efficiency is further improved.

Next, another example (second example) will be described. A mobile terminal of the second example displays, at the time when an operation of starting creation of a new electronic mail is performed, calendar event information of the appointed day or calendar event information within a predetermined period (for example, one week) from the current date as an input candidate with respect to the newly created electronic mail (new mail).

It should be noted that, since a hardware configuration of this mobile terminal is the same as that of the first example, a reference is made to FIGS. 1 and 2. Since the contents of main memory 34 of mobile terminal 10 is also the same as the first example except for the function of mail creating program 52*a*, a reference is made to FIGS. 6 and 7.

Hereinafter, with reference to FIGS. 12A to 12C, a situation will be described in which, in mobile terminal 10, calendar event information within one week from the current date among calendar event information 68 registered in the electronic calendar is displayed as input candidates in response to a operation to start creating a new mail, and desired calendar event information is selected from the input candidates by a touch operation and described in a new mail.

Figure 12A:
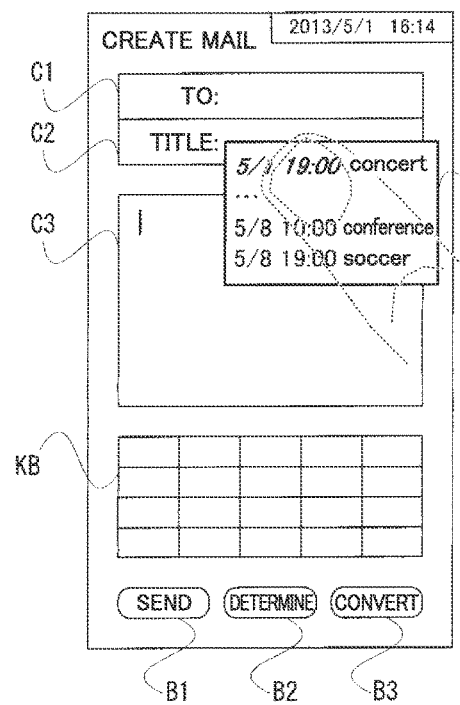
FIGS. 12A to 12C are an illustration diagram representing in time series an example of changes of a touch screen in a second example, where

Firstly, as shown in FIG. 12A, if a operation to start creating a new mail is performed at 16:14 of May 1, 2015, calendar information (excluding a body text) within one week from the current date (5/1-5/8), which includes "5/1 18:00 concert," "5/8 10:00 conference," and "5/8 19:00 soccer" herein, among calendar event information 68 of FIG. 7 is displayed in input candidate window Wn opened on a new mail creating screen.

Figure 12B:
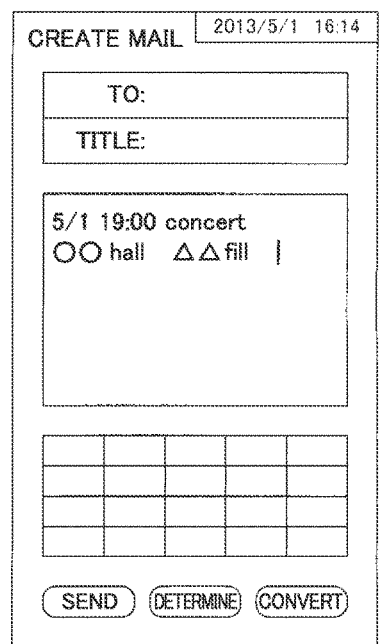

After that, as shown in FIG. 12B, when desired calendar event information, for example, "5/1 18:00 concert" is selected from displayed input candidate window Wn by a touch operation, the selected calendar event information, in other words, "5/1 18:00 concert ○○ hall ΔΔ fill" is described in a body text of an electronic mail.

Figure 12C:
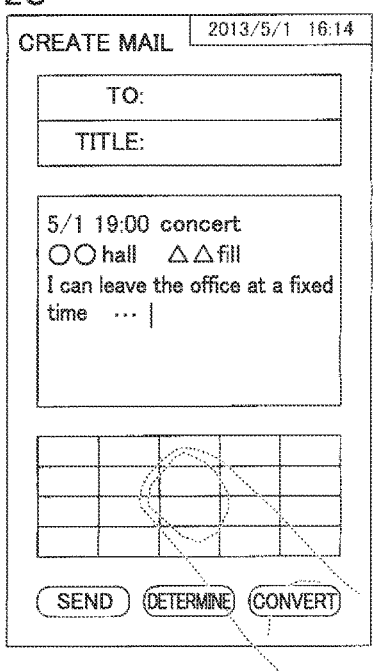

Subsequently, as shown in FIG. 12C, when any character string, for example, "I can leave the office at a fixed time" is inputted with virtual keyboard KB, the inputted character string is added to a body text of an electronic mail.

It should be noted that mail creating processing in response to character string input with virtual keyboard KB subsequent to FIG. 12C may be the same as that in the first example (FIGS. 4A to 4D to 11A to 11D). When the character string inputted with virtual keyboard KB matches with a date-time or a word included in calendar event information 68 registered to the electronic calendar, the processing of presenting calendar event information including the matched date-time or the matched word as input candidates for a new mail and describing the calendar event information selected therefrom by a touch operation to a new mail may be performed.

The new mail creating processing described above is achieved, for example, by CPU 24 executing processing in accordance with the flowcharts shown in FIGS. 13 and 14 based on various programs and data stored in main memory 34 and shown in FIGS. 6 and 7.

FIG. 13 represents a flowchart of the new mail creating processing executed by CPU 24. FIG. 14 represents a detailed flowchart of input candidate initial display processing included in the new mail creating processing of FIG. 13.

The flowchart of FIG. 13 is started when the new mail creating operation is performed. Referring to FIG. 13, after CPU 24 displays a new mail creating screen in step S51, the processing proceeds to step S53, and CPU 24 can execute input candidate initial display processing. This input candidate initial display processing is executed, in detail, in accordance with the flowchart of FIG. 14.

Referring to FIG. 14, CPU 24 can open input candidate window Wn on the new mail creating screen in first step S61. In next step S63, CPU 24 can refer to current date-time information 62. Then, CPU 24 can display calendar event information of a current date (in other words, including a date indicated by current date-time information 62), or calendar event information within one week from the current date (in other words, including any date between the date indicated by current date-time information 62 and the date one week after the current date) in input candidate window Wn. Consequently, the new mail creating screen takes such a form as shown in FIG. 12A. After that, the processing returns to the flowchart of FIG. 13.

It should be noted that, in step S65, displaying only calendar event information of a current date or displaying calendar event information within a certain period (one week, one month, or the like) from the current date can be set or changed by a user through a menu operation or the like in advance.

Referring back to FIG. 13, CPU 24 can determine in step S55 whether or not any calendar event information is selected from input candidates displayed in input candidate window Wn. If it is NO, the processing is shifted to the mail creating processing based on a character string input operation with virtual keyboard KB as shown in FIG. 12C. Or, the processing may be shifted to the mail creating processing which is the same as that described in the first example based on a character string input operation with virtual keyboard KB and a selection operation of calendar event information by input candidate window Wn as shown in FIGS. 4A to 4D and FIGS. 5A to 5D.

It should be noted that, in the mail creating processing subsequent to step S57, utilizing only virtual keyboard KB or also using input candidate window Wn may be set or change by a user by a menu operation in advance.

As described above, according to the second example, at the time when the operation to start creating a new mail is performed, calendar event information of a current date or a date within a certain period is displayed as an input candidate on a new mail creating screen displayed in response to this. By only selecting a necessary one from input candidates displayed in such a manner, the selected calendar event information is described in a new mail, so that the number of operation steps can be further reduced.

Next, another example (third example) will be described. At the time when the operation to start creating a reply mail to a received mail is performed, and a date-time or a word registered in the electronic calendar is described in the received mail, a mobile terminal of the third example displays calendar event information including the described date-time or the described word as an input candidate to a reply mail.

It should be noted that, since a hardware configuration of this mobile terminal is the same as that of the first example, a reference is made to FIGS. 1 and 2. Since the contents of main memory 34 of mobile terminal 10 are also the same as the first example except for the function of mail creating program 52*a*, a reference to FIGS. 6 and 7 is made.

Hereinafter, in mobile terminal 10, at the time of creating a reply mail to a received mail, calendar event information including a date-time or a word described in the received mail among calendar event information 68 registered to the electronic calendar is displayed as an input candidate to the reply mail. A situation will be described with reference to FIGS. 15A to 15C and 16A to 16D in which desired calendar event information is selected from those by a touch operation and described in the reply mail.

Firstly, when a received mail is selected from a received mail folder not shown in the drawings, a browsing screen for the selected received mail is displayed as shown in FIG. 15A. In a body text of a received mail, "Do you have any schedule in the morning of 5/8?" is described. At this time, when a operation to start creating a reply mail (an operation of pressing a reply button B1*a*) is performed, the browsing screen for the received mail is updated to a reply mail creating screen in a form of quoting a body text of the received mail as shown in FIG. 15B.

Referring to FIG. 15B, in the referred body text of the received mail, "5/8" indicating a date is described, and on the other hand, in calendar event information 68, two calendar event information including the same date, in other words, "5/8 10:00 conference . . . " and "5/8 19:00 soccer . . . " are registered. Therefore, input candidate window Wn is opened on the reply mail creating screen, and these two calendar event information (except for the body text), in other words, "5/8 10:00 conference" and "5/8 19:00 soccer" are displayed.

After that, when desired event information, for example, "5/8 10:00 conference" is selected from input candidate window Wn, the selected calendar event information (also including the body text), in other words, "5/8 10:00 conference project of ○○ product" is described in the body text of the reply mail.

When another received mail is selected from the received mail folder, a browsing screen for the selected received mail is displayed as shown in FIG. 16A. In the body text of this received mail, "Shall we watch a soccer match?" is displayed. In this state, when the operation to start creating a reply mail is performed, the browsing screen for the received mail is updated to the reply mail creating screen as shown in FIG. 16B.

Referring to FIG. 16B, in the referred body text of the received mail, a word indicating an event, in other words, "soccer" is described, and on the other hand, two calendar event information including the same word, in other words, "4/20 18:30 soccer . . . " and "5/8 19:00 soccer . . . " are registered in calendar event information 68. Therefore, input candidate window Wn is opened, and these two calendar event information (except for the body text), in other words, "4/20 18:30 soccer" and "5/8 19:00 soccer" are displayed.

After that, when desired calendar event information, for example, "5/8 19:00 soccer" is selected from input candidate window Wn, the selected calendar event information (including the body text), in other words, "5/8 19:00 soccer ○○ ball game field △△ vs xx" is described in the body text.

It should be noted that, although illustration in the drawing is omitted, also in this example, as shown in FIGS. 15C and 16C, after describing the calendar event information selected from input candidate window Wn in the reply mail, in response to input of any character string with virtual keyboard KB, the processing of adding the inputted character string to the reply mail is performed continuously.

Such reply mail creating processing in response to the character string input with virtual keyboard KB may be the same as that of the first example (FIGS. 4A to 4D to FIG. 11A to 11D). When the character string inputted with virtual keyboard KB matches with a date-time or a word included in calendar event information 68 registered to the electronic calendar, the processing of processing calendar event information including the matched date-time or the matched word as an input candidate and describing calendar event information selected from the input candidate by the touch operation may be performed.

Figure 17:
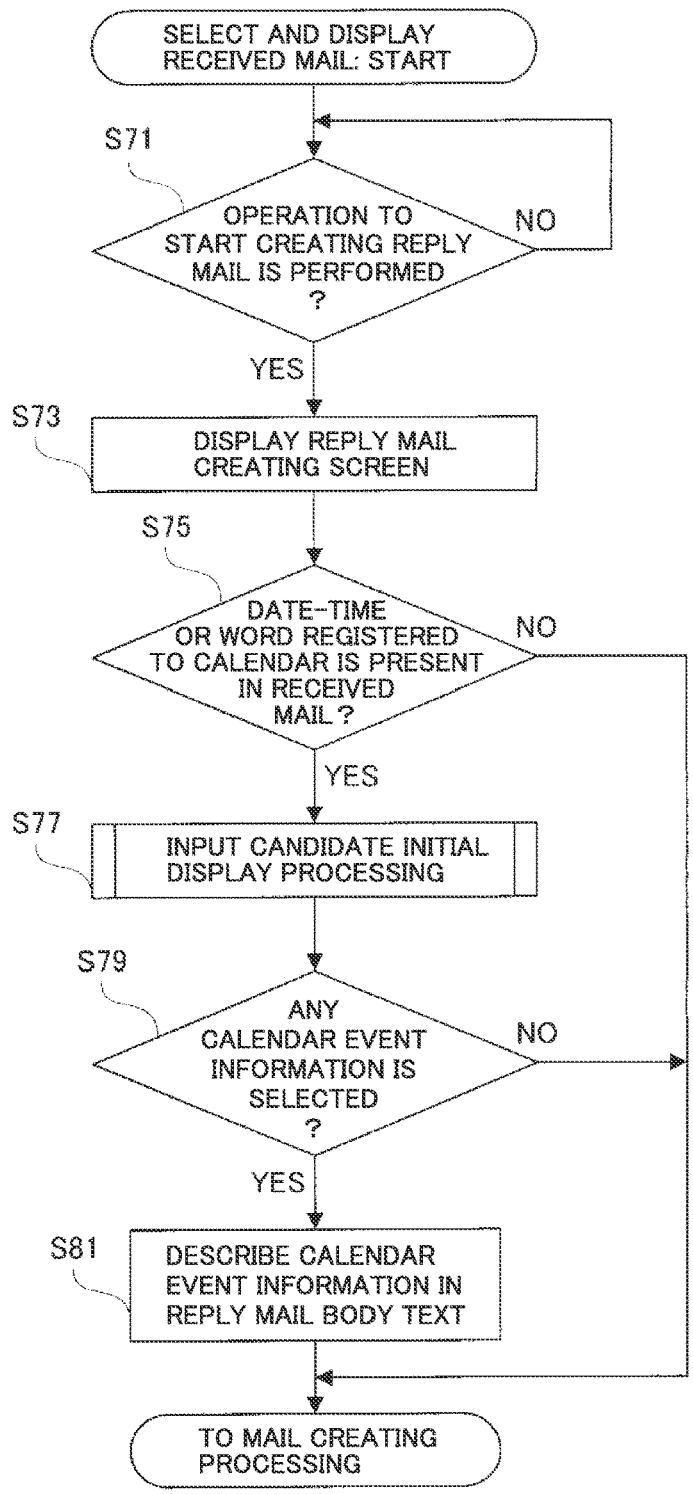
FIG. 17 is a flowchart representing mail creating processing corresponding to FIGS. 15A to 15D and 16A to 16C.
Figure 18:
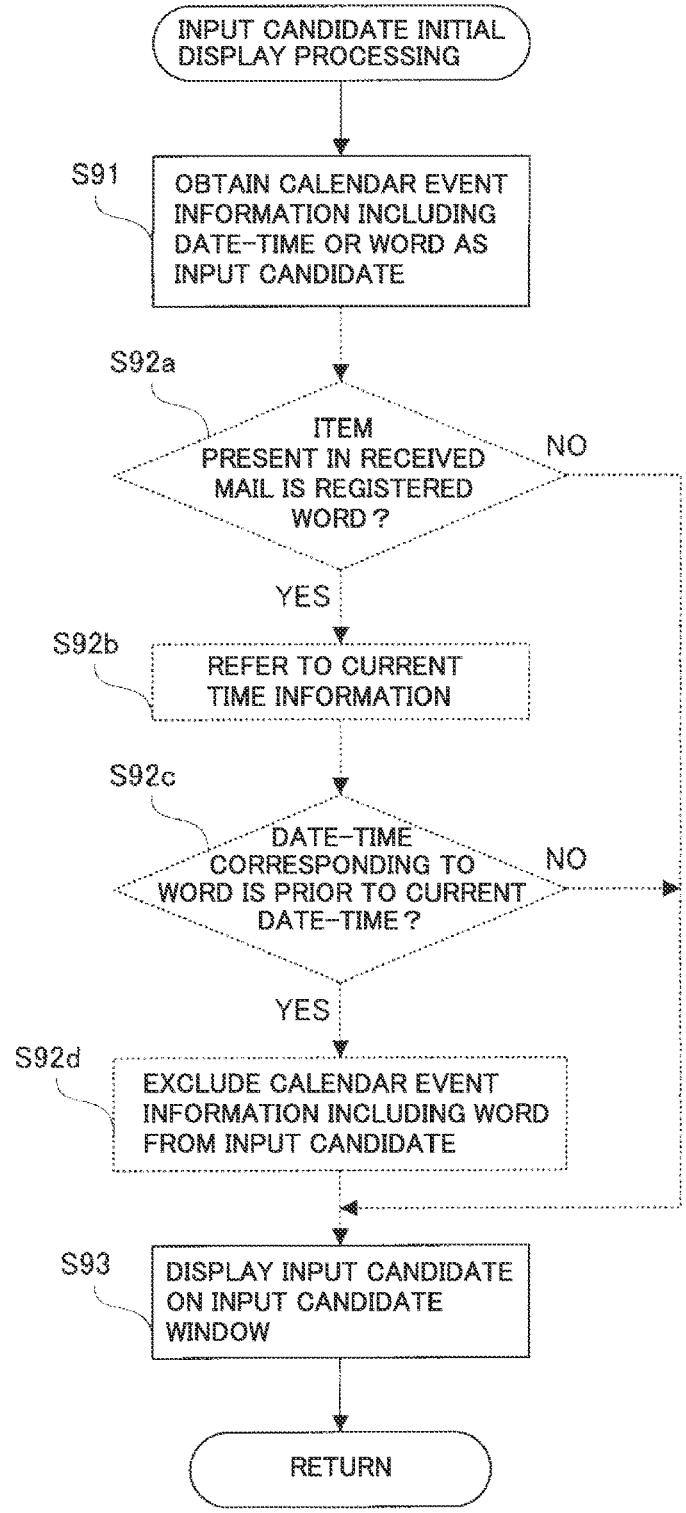
FIG. 18 is a flowchart representing input candidate initial display processing included in the mail creating processing of FIG. 17.

The reply mail creating processing as described above is achieved by CPU 34 executing the processing in accordance with the flowcharts shown in FIGS. 17 and 18 based on various programs and data stored in main memory 34 and shown in FIGS. 6 and 7.

FIG. 17 represents a flowchart of a reply mail creating processing by CPU 24. FIG. 18 represents a detailed flowchart of input candidate initial display processing included in the reply mail creating processing of FIG. 17.

The flowchart of FIG. 17 starts when any received mail is selected and a browsing screen of a received mail as shown in FIGS. 15A and 16A is displayed. Referring to FIG. 17, CPU 24 can determine in step S71 whether or not a reply mail creating operation is performed based on touch information 64. If it is NO, the same determination is repeated with a predetermined standby time.

If it is YES in step S71, the processing proceeds to step S73, and CPU 24 can display a reply mail creating screen in a form of referring to the received mail. Then, in next step S75, CPU 24 can determine whether or not a date-time or a word registered to the electronic calendar is present in the body text of the received mail based on calendar event information 68 and received mail information 70b.

If it is NO in step S75, the processing is shifted to the mail creating processing based on the character string input with virtual keyboard KB. If it is YES in step S75, CPU 24 can execute the input candidate initial display processing. The input candidate initial display processing of step S75 is executed, in detail, in accordance with the flowchart of FIG. 18.

Referring to FIG. 18, in first step S91, CPU 24 can obtain calendar event information including the date-time or the word as a display candidate (in other words, CPU 24 reads out calendar information including the date-time or the word described in the received mail from calendar event information 68 stored in data region 60 and retain the same in an internal memory which is not illustrated in the drawings). Then, in next step S93, CPU 24 can display the obtained input candidate in input candidate window Wn. Consequently, the reply mail creating screen takes a form as shown in FIGS. 15B) and 16B. After that, the processing returns to the flowchart of FIG. 17.

It should be noted that, in step S93, displaying only the calendar event information of a present date or displaying the calendar event information within a certain period (for example, one week, one month, or the like) from the present date can be set or changed by a user with an operation in advance.

Referring to FIG. 17 again, CPU 24 can determine in step S79 whether or not any calendar event information is selected from input candidates shown in input candidate window Wn. If it is NO, the processing is shifted to the mail creating processing based on the character string input with virtual keyboard KB.

If it is YES in step S79, the processing proceeds to step S81, and CPU 24 can describe the calendar event information in the body text of transmitted mail information 70a. Consequently, the reply mail creating screen takes a form as shown in FIGS. 15C and 16C. After that, the processing is shifted to the electronic mail processing based on the character string input with virtual keyboard KB.

It should be noted that, the mail creating processing executed when it is NO in step S75, when it is NO in step S79, or after step S81 may be the same mail creating processing as the one described in the first example based on the character string input operation with virtual keyboard KB and a selection operation of calendar event information by input candidate window Wn as shown in FIGS. 4A to 4D and FIGS. 5A to 5D.

As described above, according to the third example, just by selecting a necessary one from input candidates displayed as input candidate indicating calendar event information including a date-time or a word described in a received mail in a reply mail creating screen at the time of performing a reply mail creating operation with respect to a received mail and in response to the operation, the selected calendar event information is described in the reply mail. Therefore, the number of operation steps can be further reduced.

It should be noted that, although the case is described above where an input to a mail body text (body text display column C3: FIG. 3) is performed, the same control can be performed also when an input to a title (title display column C2) is performed.

It should be noted that, in the third example, when a date-time or a word registered to the electronic calendar is described in the received mail, CPU 24 displays the calendar event information including the date-time or the word as an input candidate with respect to a reply mail. However, when the item described in the received mail is a word, calendar information including a date-time prior to the date-time indicated by current date-time information 62 in calendar information including the word may be excluded from the input candidate.

Such modification is achieved by inserting steps S92a to 92d indicated by dotted lines between steps S91 and 93 in the flowchart of the above-described FIG. 18. Referring to FIG. 18, in step S91, CPU 24 can obtain (retain in an internal memory) calendar event information including a date-time present in a received mail or an inputted word from the electronic calendar. After that, in step S92a, CPU 24 can determine whether or not the one present in the received mail is a registered word. When the determination result in step S92a is NO, in other words, when the one present in the received mail is a registered date-time, the processing proceeds to step S93.

When the determination result in step S92a is YES, in other words, the one present in the received mail is a registered word, CPU 24 refers to current date-time information 62 in step S92b and determine whether or not the date-time corresponding to the word is prior to the current date in step S92c. When the determination result in step S92c is NO, in other words, when the date-time corresponding to the word is on or after the current date, the processing proceeds to step S93.

When the determination result in step S92c is YES, in other words, the date-time corresponding to the word is prior to the current date-time, the calendar event information including the word can be excluded in step S92d (in other words the one having a date prior to the current date-time among input candidates retained in the internal memory is deleted). After that, the processing proceeds to step S93.

Thus, in step S93, when an input candidate prior to the current date-time is included in the obtained input candidates, display candidates excluding it can be displayed in input candidate window Wn. In other words, calendar event information including a date-time (may be a prior date-time, or a date-time on or after a current date-time) matched with a character string in a received mail, or calendar event information on or after a current date including a word matched with a character string present in a received mail is displayed.

According to this flowchart, when calendar event information 68 like the one shown in FIG. 7 is registered, and "soccer" is described in a received mail, there are two calendar event information including this word, such as "4/20 18:30 soccer . . . " and "5/8 19:00 soccer . . . ." However, since the date-time of the former, in other words, "4/20 18:30" is prior to a current date-time, in other words, "5/1 16:14," the former, in other words, "4/20 18:30 soccer" is excluded from input candidates in step S92d. Thus, in step S93, as shown in FIG. 19B, only the latter, in other words, "5/8 19:00 soccer" is displayed in input candidate window Wn, consequently.

After that, when a user touches "5/8 19:00 soccer," as shown in FIG. 19C, a whole text of the touched calendar event information, in other words, "5/8 19:00 soccer ○○ ball game field ΔΔ vs xx" is described in a body text of a reply mail.

Accordingly, when a user inputs a word (event name or the like), the prior calendar event information is excluded from the input candidates. Therefore, displaying calendar event information having a low necessity can be suppressed, so that operability is improved. On the other hand, when a user intentionally inputs a prior date-time, calendar event information including that date-time is displayed as an input candidate. Therefore, there would be no need to minutely input the calendar event information, so that the number of operation steps is reduced. Thus, efficiency is further improved.

It should be noted that, generally, when an operation to start creating an electronic mail is performed by an operation unit, CPU 24 can initially display at least a part of calendar event information registered to the electronic calendar on display 30 as an input candidate (S53: S61-S65/S71: YES→S75:YES→S77). It can be configured such that, when any initially displayed calendar event information is selected at touch panel 32, CPU 24 can describe the selected calendar event information in an electronic mail (S55: YES→S57/S79:YES→S81). Accordingly, at the time when an electronic mail creating operation is performed, at least a part of the registered calendar event information is displayed as an input candidate on a mail creating screen in response to the electronic mail creating operation. Just by selecting a necessary one from the input candidates displayed in such a manner, the selected calendar event information is described in an electronic mail. Therefore, the number of operation steps can be further reduced.

It should be noted that, in the description above, an input candidate matched with the electronic calendar is displayed in input candidate window Wn. However, it is not always necessary to open a dedicated window, and an existing display area may be utilized. For example, there has been conventionally known that a prediction conversion is performed when a character is inputted and some prediction conversion candidates are displayed. The input candidate matched with the electronic calendar may be further displayed in the region where the prediction conversion candidate is displayed. In that case, the order of displaying the candidate may be such that an input candidate matched with the electronic calendar is before the prediction conversion candidate or an input candidate matched with the electronic calendar is displayed after the prediction conversion candidate.

It should be noted that, although mobile terminal 10 of each example described above is typically a smart phone, it may be any kind of mobile terminal (for example, a tablet PC, a mobile information terminal, a cellular phone, or the like) as long as it has a touch screen (a display provided with a touch panel) and a computer (a CPU, a memory, and the like).

The present disclosure can be applied not only to a mobile terminal but also various information processing apparatuses having a touch screen and a computer (for example, a non-portable PC, an information terminal, an information home appliance, and the like).

It can be applied also to an information processing apparatus having a display and an operation unit capable of inputting at least a character string (for example, a key input device such as a keyboard and a numerical key, and/or a pointing device such as a mouse and a touchpad), in place of the touch screen.

(Other Embodiments)

In the first embodiment, an information processing apparatus (10) includes a display (20) and an operation unit (32), and it has an electronic calendar function and an electronic mail function. In such an information processing apparatus, for example, a computer (24) executes a mail creating program (52a) stored in a memory (34) to achieve a registration unit (54, 68), an input candidate display unit (S3: YES→S5:YES→S21), and a description unit (S23: YES→S25).

The registration unit can register calendar event information including at least any date and time and a word indicating an event held on that date and time to the electronic calendar. When a character inputted by the operation unit matches with a date and time or a word included in the calendar event information registered by the registration unit, the input candidate display unit can display the calendar event information including the matched date and time or the matched word as an input candidate on the display. Then, when any calendar event information displayed by the input candidate display unit is selected by the operation unit, the description unit can describe the selected calendar event information in an electronic mail.

According to the first embodiment, when a user inputs a date and time or a word registered to the electronic calendar, calendar event information including the inputted date and time or the inputted word is displayed as an input candidate. Just by selecting a necessary one from the input candidates displayed in such a manner, the selected calendar event information is described in the electronic mail. Therefore, it would not be necessary to select a necessary one from among a large amount of calendar event information and minutely input the same, so that the number of operation steps is reduced. Thus, an electronic mail can be created efficiently with reference to the electronic calendar.

The second embodiment is an information processing apparatus referring to the first embodiment, and further includes a supply unit which supplies current date and time information indicating a current date and time. When the item matched with the character is a word, the input candidate display unit can exclude from the input candidates the calendar event information including a date and time prior to the date indicated by the current date and time information among calendar event information including the matched word.

In the second embodiment, a supply unit (24r, 62) is further achieved. The supply unit supplies current date and time information indicating a current date and time. When the item matched with a character is a word, the input candidate display unit can exclude calendar event information including a date and time prior to a date and time indicated by current date and time information from an input candidate among calendar event information including the matched word (S21:S42a-S42d).

According to the second embodiment, when a user inputs a word (such as an event name), prior calendar event information is excluded from the input candidates. Therefore, displaying calendar event information having a low necessity can be suppressed, so that operability is improved. On the other hand, when a user intentionally inputs a prior date and time, calendar event information including the date and time is displayed. Therefore, it would not be necessary to minutely input the calendar event information, so that the number of operation steps is reduced. Thus, the efficiency is further improved.

A third embodiment relates to an information processing apparatus referring to the first or second embodiment. The registration unit can further register a body text indicating a detail of an event. The input candidate display unit can display calendar event information excluding the body text. The description unit can describe calendar event information including the body text.

According to the third embodiment, the amount of information of the displayed calendar event information can be suppressed, so that operability is improved.

A fourth embodiment relates to an information processing apparatus referring to the first or second embodiment. This information processing apparatus further includes an attachment unit which can attach calendar event information selected by the operation unit in a form which can be registered to the electronic calendar.

In the fourth embodiment, an attachment unit (S31) is further achieved. The attachment unit can attach calendar event information selected by the operation unit in a form which can be registered to the electronic calendar.

According to the fourth embodiment, a user of a transmission destination of an electronic mail can readily register the calendar event information described in the electronic mail to the electronic calendar without minutely inputting it.

A fifth embodiment relates to an information processing apparatus referring to the first embodiment. This information processing apparatus further includes an input candidate initial display unit which can initially display at least a part of calendar event information registered by the registration unit on a display as an input candidate when an operation of starting creation of an electronic mail is performed, and an initial description unit which, when any calendar event information displayed by the input candidate initial display unit is selected by the operation unit, can describe the selected calendar event information in an electronic mail.

In the fifth embodiment, an input candidate initial display unit (S53:S61-S65/S71:YES→S75:YES→S77) and an initial description unit (S55:YES→S57/S79:YES→S81) can be further achieved. When an operation to start creation of electronic mail is started by the operation unit, the input candidate initial display unit can initially display at least a part of calendar event information registered by the registration unit on the display as an input candidate. When any calendar event information displayed by the input candidate initial display unit is selected by the operation unit, the initial description unit can describe the selected calendar event information in an electronic mail.

According to the fifth embodiment, at the time when the electronic mail creating operation is performed, at least a part of the registered calendar event information is displayed as an input candidate on a mail creating screen displayed in response. Just by selecting a necessary one from input candidates displayed in such a manner, the selected calendar event information is displayed in an electronic mail, so that the number of operation steps can be further reduced.

A sixth embodiment relates to an information processing apparatus referring to the fifth embodiment, and it further includes a supply unit which supplied current date and time information indicating a current date and time. When an operation to start creating a new mail is performed by the operation unit, and calendar event information including a date indicated by current date and time information or calendar event information including a date within a certain period from the date is registered by the registration unit, the input candidate initial display unit can initially display the registered calendar event information on the display an input candidate. When any calendar event information displayed by the input candidate initial display unit is selected by the operation unit, the initial description unit can describe the selected calendar event information in a new mail. Input by the operation unit, display by the input candidate display unit, and description by the description unit are performed with respect to a new mail.

In the sixth embodiment, a supply unit (24r, 62) is further achieved. The supply unit can supply current date and time information indicating a current date and time. When an operation to start creating a new mail is performed by the operation unit, and calendar event information including a date indicated by current date and time information or calendar event information including a date within a certain period from that date is registered by the registration unit, the input candidate initial display unit (S53:S61-S65) can initially display the registered calendar event information on the display as an input candidate. When any calendar event information displayed by the input candidate initial display unit is selected by the operation unit, the initial description unit (S55:YES→S57) can describe the selected calendar event information in a new mail. Then, input by the operation unit, display by the input candidate display unit, and description by the description unit are performed with respect to this new mail.

According to the sixth embodiment, at the time when an operation to create a new mail is performed, calendar event information of a current date or calendar event information within a current date is displayed on a new mail creating screen displayed in response to this as an input candidate. Just by selecting a necessary one from the input candidates displayed in such a manner, the selected calendar event information is described in a new mail, so that the number of operation steps can be further reduced.

A seventh embodiment relates to an information processing apparatus referring to the fifth embodiment. When an operation to start creating a reply mail to a received mail is performed by the operation unit, and a date and time or a word included in calendar event information registered by the registration unit is described in the received mail, the input candidate initial display unit can display calendar event information including the described date and time or the described word on the display as an initial input candidate. When any calendar event information displayed by the input candidate initial display unit is selected by the operation unit, the initial description unit can describe the calendar event information in a reply mail. Input by the operation unit, display by the input candidate display unit, and description by the description unit are performed with respect to a reply mail.

In the seventh embodiment, when an operation to start creating a reply mail to a received mail is performed by the operation unit, and a date and time or a word included in the calendar event information registered by the registration unit is described in the received mail, the input candidate initial display unit (S71:YES→S75:YES→S77) can display calendar event information including the described date and time or the described word on the display as an initial input candidate. When any calendar event information displayed by the input candidate initial display unit is selected by the operation unit, the initial description unit (S79:YES→S81) can describe the calendar event information in a reply mail. Then, input by the operation unit, display by the input candidate display unit, and description by the description unit are performed with respect to this reply mail.

According to the seventh embodiment, at the time when an operation to create a reply mail with respect to a received mail is performed, in a reply mail creating screen displayed in response to this, calendar event information including a date and time or a word described in a received mail is displayed as an input candidate. By only selecting a necessary one from the input candidates displayed in such a manner, the calendar event information is described in a reply mail, so that the number of operation steps can be further reduced.

An eighth embodiment relates to an information processing apparatus referring to any one of the first to seventh embodiments. The operation unit is a touch panel provided on the display.

In the eighth embodiment, the touch screen (TS) is constituted of the display and the touch panel (32). A user can perform input of a character by the virtual keyboard (KB) on the touch screen, and selection of calendar event information by the touch operation with respect to calendar event information on the touch screen. Accordingly, as a result of integrating the function of the operation unit in the touch screen, an electronic mail can be created more efficiently.

A ninth embodiment relates to a mail creating method performed by an information processing apparatus (10) including a display (30) and an operation unit (32) and having an electronic calendar function and an electronic mail function. This mail creating method includes a registration step (54, 68) of registering calendar event information including at least any date and time and a word indicating an event held on that date and time to an electronic calendar, an input candidate displaying step of, when a character inputted by the operation unit matches with a date and time or a word included in the calendar event information registered in the registration step, displaying calendar event information including the matched date and time or the matched word on the display (30) as an input candidate (S3:YES→S5:YES→S21), and a description step of, when any calendar event information displayed in the input candidate displaying step is selected by the operation unit, describing the selected calendar event information in an electronic mail (S23:YES→S25).

Also with each of the ninth and tenth embodiments, as with the first embodiment, the number of operation steps can be reduced, so that an electronic mail can be created efficiently with reference to the electronic calendar.

Another embodiment relates to an information processing apparatus (10) having an electronic calendar function and an electronic mail function, and it includes a display (30), a registration unit (54, 68) registering calendar event information at least including any date and time and an event held on that date and time to the electronic calendar (54, 68), an operation unit (32), and a supply unit (24r, 62) configured to supply current date and time information indicating a current date and time. This information processing apparatus includes an input candidate initial display unit which, when an operation to start creating a new mail is performed by the operation unit, and calendar event information including a date and time indicated by current date and time information or a date and time within a certain period from that date and time is registered by the registration unit, initially displays the registered calendar event information on the display (30) an input candidate (S53:S61-S65), and an initial description unit which, when any calendar event information displayed by the input candidate initial display unit is selected by the operation unit, describes the selected calendar event information in a new mail (S55:YES→S57).

This another embodiment is an information processing apparatus (10) having the electronic calendar function and the electronic mail function, and it includes a registration unit (54, 68) registering calendar event information including at least any date and time and a word indicating an event held on that date and time to the electronic calendar. This information processing apparatus includes an input candidate initial display unit which, when an operation to start creating a reply mail to a received mail is performed by the operation unit, and a date and time or a word included in the calendar event information registered by the registration unit is described in the received mail, displays calendar event information including the described date and time or the described word on the display (30) as an initial input candidate (S71:YES→S75:YES→S77), and an initial description unit which, when any calendar event information displayed by the input candidate initial display unit is selected by the operation unit, describes the calendar event information in a reply mail (S79:YES→S81).

Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. An information processing apparatus having an electronic calendar function and an electronic mail function, the information processing apparatus comprising:
 a display;
 an input device;
 a memory that stores calendar event information registered with an electronic calendar, wherein the calendar event information comprises a title, a body text, a date, a time, and a word for each of one or more events; and
 at least one processor configured to, during creation of an electronic mail,
  receive an input character string via the input device,
  when the character string matches the date or time for at least one event in the registered calendar event information, display a selectable representation of each of the one or more events that has a matching date or time, regardless of whether the date or time is a past, current, or future date or time, wherein the selectable representation of each event includes the title, but not the body text, for the event,
  when the character string matches the word for at least one event in the registered calendar event information, display a selectable representation of each of the one or more events that has a matching word only if the date and time for the event is not a past date and time, wherein the selectable representation of each event includes the title, but not the body text, for the event, and
  when any displayed selectable representation of an event is selected via the input device, insert a description of the event corresponding to the selected representation into the electronic mail, wherein the description includes the body text for the event.

2. The information processing apparatus according to claim 1, wherein the at least one processor is configured to, when any displayed selectable representation of an event is selected via the input device, attach calendar event information for the event corresponding to the selected representation in a format which can be registered to the electronic calendar.

3. The information processing apparatus according to claim 1, wherein the at least one processor is configured to, in response to initiating an application for creating a new electronic mail, display a selectable representation of each of the one or more events that has a date or time within a predetermined future time period.

4. The information processing apparatus according to claim 1, wherein the at least one processor is configured to, in response to initiating an application for creating a reply electronic mail to a received electronic mail:
 parse the received electronic mail;
 when the received electronic mail contains a character string that matches the date or time for at least one event in the registered calendar event information, display a selectable representation of each of the one or more events that has a matching date or time, regardless of whether the date or time is a past, current, or future date or time;
 when the received electronic mail contains a character string that matches the word for at least one event in the registered calendar event information, display a selectable representation of each of the one or more events that has a matching word only if the date and time for the event is not a past date and time; and,
 when any displayed selectable representation of an event is selected via the input device, insert a description of the event corresponding to the selected representation into the reply electronic mail.

5. The information processing apparatus according to claim 1, comprising a touch panel display that comprises the display and a touch panel as the input device.

6. A mail creating method comprising:
 storing calendar event information registered with an electronic calendar, wherein the calendar event information comprises a title, a body text, a date, a time, and a word for each of one or more events;
 receiving an input character string;
 when the character string matches the date or time for at least one event in the registered calendar event information, displaying as selectable representation of each of the one or more events that has a matching date or time, regardless of whether the date or time is a past, current, or future date or time, wherein the selectable representation of each event includes the title, but not the body text, for the event;
 when the character string matches the word for at least one event in the registered calendar event information, displaying a selectable representation of each of the one or more events that has a matching word only if the date and time for the event is not a past date and time, wherein the selectable representation of each event includes the title, but not the body text, for the event; and,
 when any displayed selectable representation of an event is selected, inserting a description of the event corresponding to the selected representation into an electronic mail, wherein the description includes the body text for the event.

* * * * *